United States Patent
Uenishi et al.

(10) Patent No.: US 10,542,202 B2
(45) Date of Patent: Jan. 21, 2020

(54) CONTROL APPARATUS THAT PERFORMS FOCUSING BY IMAGING-PLANE PHASE DIFFERENCE AF, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Masaaki Uenishi, Kawasaki (JP); Satoshi Kimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 15/673,518

(22) Filed: Aug. 10, 2017

(65) Prior Publication Data

US 2018/0063412 A1    Mar. 1, 2018

(30) Foreign Application Priority Data

Aug. 24, 2016 (JP) ................. 2016-163224
Aug. 4, 2017 (JP) ................. 2017-151555

(51) Int. Cl.
 *H04N 5/232* (2006.01)
(52) U.S. Cl.
 CPC ................. *H04N 5/23212* (2013.01)
(58) Field of Classification Search
 None
 See application file for complete search history.

(56) References Cited

U.S. PATENT DOCUMENTS

| | | | | |
|---|---|---|---|---|
| 6,271,883 | B1* | 8/2001 | Iijima | H04N 5/23212 348/345 |
| 7,511,759 | B2 | 3/2009 | Yagi et al. | |
| 9,288,382 | B2* | 3/2016 | Fujii | H04N 5/347 |
| 9,398,206 | B2 | 7/2016 | Uenishi | |
| 9,462,177 | B2 | 10/2016 | Fukuda | |
| 2001/0012074 | A1* | 8/2001 | Ohkawara | H04N 5/23212 348/240.3 |
| 2015/0009383 | A1* | 1/2015 | Fujii | H04N 5/347 348/302 |
| 2015/0341543 | A1* | 11/2015 | Yokozeki | H04N 5/23229 348/353 |
| 2016/0198107 | A1* | 7/2016 | Yamazaki | G02B 7/38 348/350 |
| 2018/0309925 | A1* | 10/2018 | Shimizu | H04N 5/23212 |

FOREIGN PATENT DOCUMENTS

| | | |
|---|---|---|
| EP | 1085751 A2 | 3/2001 |
| JP | 2001-083407 A | 3/2001 |
| JP | 2014-219549 A | 11/2014 |

\* cited by examiner

*Primary Examiner* — Cynthia Segura
(74) *Attorney, Agent, or Firm* — Venable LLP

(57) ABSTRACT

A control apparatus includes an acquirer (204a) which acquires a first signal and a second signal that correspond to light beams passing through different pupil regions of an image capturing optical system, a calculator (204b) which performs a plurality of filtering processes with different bands for the first signal and the second signal to calculate a plurality of defocus amounts and reliabilities based on the first signals and the second signals where the respective filtering processes have been performed, and a determiner (209) which determines a defocus amount used for focusing from among the plurality of defocus amounts based on a difference between the plurality of defocus amounts and at least one of the plurality of reliabilities.

10 Claims, 30 Drawing Sheets

FIG. 2A

PIXEL CONFIGURATION OF NON-IMAGING-PLANE PHASE DIFFERENCE METHOD

| R | Gr | R | Gr | R | Gr | R | Gr |
|---|----|---|----|---|----|---|----|
| Gb | B | Gb | B | Gb | B | Gb | B |

FIG. 2B

PIXEL CONFIGURATION OF IMAGING-PLANE PHASE DIFFERENCE METHOD

| R A | R B | Gr A | Gr B | R A | R B | Gr A | Gr B | R A | R B | Gr A | Gr B | R A | R B | Gr A | Gr B |
|-----|-----|------|------|-----|-----|------|------|-----|-----|------|------|-----|-----|------|------|
| Gb A | Gb B | B A | B B | Gb A | Gb B | B A | B B | Gb A | Gb B | B A | B B | Gb A | Gb B | B A | B B |

■TARGET POSITION SELECTION RULE WHILE ZOOMING IS STOPPED

|   | RELIABILITY | TARGET POSITION |
|---|---|---|
| 1 | IN FOCUS | DETECTED DISTANCE |
| 2 | NEAR IN-FOCUS | DETECTED DISTANCE × $\gamma$ |
| 3 | DIRECTION SPECIFIED | END OF DETECTION DIRECTION |
| 4 | UNDETECTABLE | END AT INFINITY / CLOSE DISTANCE |

FIG. 18A

■TARGET POSITION SELECTION RULE DURING ZOOMING

|   | RELIABILITY | TARGET POSITION |
|---|---|---|
| 1 | IN FOCUS | DETECTED DISTANCE |
| 2 | NEAR IN-FOCUS | DETECTED DISTANCE × $\alpha$ |
| 3 | DIRECTION SPECIFIED | CURRENT POSITION + $\beta$ |
| 4 | UNDETECTABLE | CURRENT POSITION |

FIG. 18B

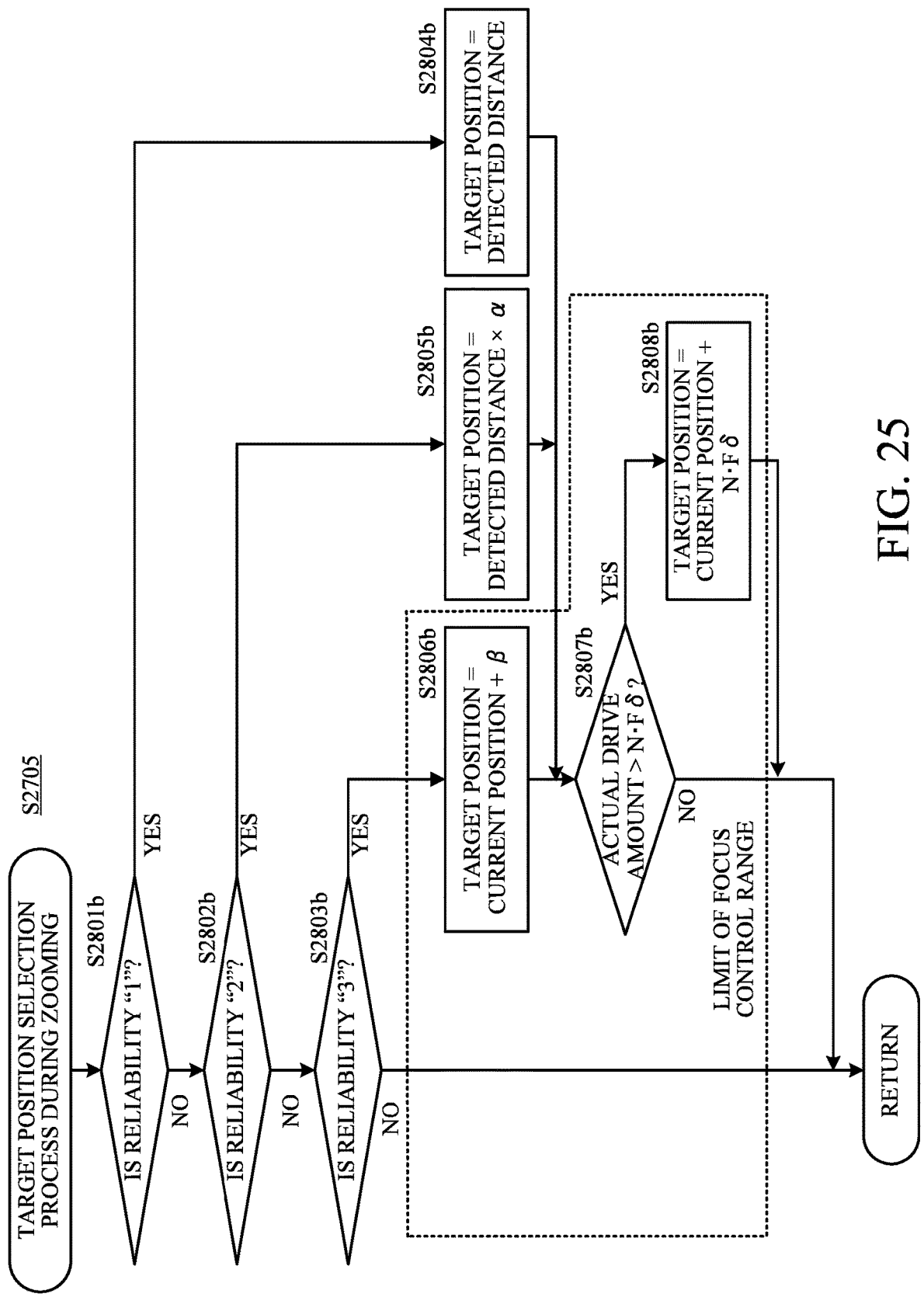

■TARGET POSITION SELECTION RULE WHILE ZOOMING IS STOPPED

|   | RELIABILITY | TARGET POSITION |
|---|---|---|
| 1 | IN FOCUS | DETECTED DISTANCE |
| 2 | NEAR IN-FOCUS | DETECTED DISTANCE × $\gamma$ |
| 3 | DIRECTION SPECIFIED | END OF DETECTION DIRECTION |
| 4 | UNDETECTABLE | END AT INFINITY / CLOSE DISTANCE |

FIG. 26A

■TARGET POSITION SELECTION RULE DURING ZOOMING

|   | RELIABILITY | TARGET POSITION |
|---|---|---|
| 1 | IN FOCUS | DETECTED DISTANCE |
| 2 | NEAR IN-FOCUS | DETECTED DISTANCE × $\alpha$ |
| 3 | DIRECTION SPECIFIED | CURRENT POSITION + $\beta$ |
| 4 | UNDETECTABLE | - |

FIG. 26B

CONTROL APPARATUS THAT PERFORMS FOCUSING BY IMAGING-PLANE PHASE DIFFERENCE AF, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to an image capturing apparatus that performs focusing by an imaging-plane phase difference AF.

Description of the Related Art

In recent years, as a phase difference AF (imaging-plane phase difference AF) using an image sensor, a method of acquiring a captured image using pixels of the image sensor and performing focus detection has been proposed.

Japanese Patent Laid-open No. 2001-083407 discloses a configuration where a plurality of photodiodes corresponding to each microlens are provided and each photodiode receives light of different pupil planes of an imaging lens. With such a configuration, it is possible to compare outputs of two photodiodes to perform the imaging-plane phase difference AF. In the imaging-plane phase difference AF, after a bandpass filtering process is performed on two (a pair of) image signals (A image signal and B image signal) of each pixel, correlation calculation of the A image signal and the B image signal is performed in a predetermined area to calculate an image shift amount, and a defocus amount is calculated based on the image shift amount.

Japanese Patent Laid-open No. 2014-219549 discloses a configuration where a first filtering process is performed on two image signals to calculate a defocus amount and a second filtering process is performed on the calculated defocus amount to generate an evaluation value of the defocus amount. Furthermore, a focus state is evaluated based on the generated evaluation value, and focusing is performed according to the evaluation result.

However, the characteristic of the defocus amount varies depending on a frequency band of the bandpass filter applied to the image signal. For example, when the frequency band is low, it is possible to detect the defocus amount even in a large blur state, but the accuracy of the defocus amount in the vicinity of the in-focus position is lowered. On the other hand, when the frequency band is high, the accuracy of the defocus amount in the vicinity of the in-focus position is high, but the defocus amount cannot be detected in the large blur state.

In Japanese Patent Laid-open No. 2014-219549, the evaluation value of the defocus amount is generated by a filtering process of a frequency band different from the frequency band of a filtering process used for calculation of the defocus amount, and the focus state is evaluated by using the evaluation value. However, only one frequency band is used as the frequency band of the bandpass filter for detecting the defocus amount. When the frequency band of the filter is set to a low frequency band, the accuracy (focusing accuracy) of the defocus amount in the vicinity of the in-focus position decreases. On the other hand, when the frequency band of the filter is set to a high frequency band, a large blur state cannot be detected, and as a result, it may take time to perform the focusing by moving a focus lens in a direction opposite to the in-focus position.

BRIEF SUMMARY OF THE INVENTION

The present invention provides a control apparatus, an image capturing apparatus, a control method, and a non-transitory computer-readable storage medium that are capable of improving focusing accuracy and reducing a focusing time.

A control apparatus as one aspect of the present invention includes an acquirer configured to acquire a first signal and a second signal that correspond to light beams passing through different pupil regions of an image capturing optical system, a calculator configured to perform a plurality of filtering processes with different bands for the first signal and the second signal to calculate a plurality of defocus amounts and reliabilities based on the first signals and the second signals where the respective filtering processes have been performed, and a determiner configured to determine a defocus amount used for focusing from among the plurality of defocus amounts based on a difference between the plurality of defocus amounts and at least one of the plurality of reliabilities.

A control apparatus as another aspect of the present invention includes an acquirer configured to acquire a first signal and a second signal that correspond to light beams passing through different pupil regions of an image capturing optical system, a calculator configured to calculate a defocus amount and a reliability based on the first signal and the second signal, and a focus controller configured to control a focus lens depending on the defocus amount and the reliability, and the focus controller is configured to limit a drive range of the focus lens depending on the defocus amount and the reliability during a drive of the zoom lens.

A control apparatus as another aspect of the present invention includes an acquirer configured to acquire a first signal and a second signal that correspond to light beams passing through different pupil regions of an image capturing optical system, a calculator configured to calculate a defocus amount and a reliability based on the first signal and the second signal, and a focus controller configured to control a focus lens depending on the defocus amount and the reliability, and the focus controller is configured to change control that depends on the defocus amount and the reliability between in a first mode where focus control is performed over a whole of a movable range of the focus lens and in a second mode where the focus control is performed within a predetermined range based on a focus lens position set by a user.

An image capturing apparatus as another aspect of the present invention includes the control apparatus and an image sensor including a first photoelectric converter and a second photoelectric converter that receive the light beams passing through the different pupil regions of the image capturing optical system, the first signal corresponds to an output signal from the first photoelectric converter, and the second signal corresponds to an output signal from the second photoelectric converter.

A control method as another aspect of the present invention includes acquiring a first signal and a second signal that correspond to light beams passing through different pupil regions of an image capturing optical system, performing a plurality of filtering processes with different bands for the first signal and the second signal to calculate a plurality of defocus amounts and reliabilities based on the first signals and the second signals where the respective filtering processes have been performed, and determining a defocus amount used for focusing from among the plurality of defocus amounts based on a difference between the plurality of defocus amounts and at least one of the plurality of reliabilities.

A non-transitory computer-readable storage medium as another aspect of the present invention stores a program that causes a computer to execute the control method.

Further features of the present invention will become apparent from the following description of exemplary embodiments with reference to the attached drawings.

BRIEF DESCRIPTION OF THE DRAWINGS

FIGS. 2A and 2B are diagrams of illustrating pixel configuration examples of a non-imaging-plane phase difference method and an imaging-plane phase difference method, respectively.

FIGS. 18A to 18C are explanatory diagrams relating to focus control during the zooming in the second embodiment.

FIG. 25 is a flowchart of illustrating an AF process in the third embodiment.

FIGS. 26A to 26D are explanatory diagrams relating to focus control during the zooming in the third embodiment.

DESCRIPTION OF THE EMBODIMENTS

Exemplary embodiments of the present invention will be described below with reference to the accompanied drawings.

First Embodiment

Figure 1:
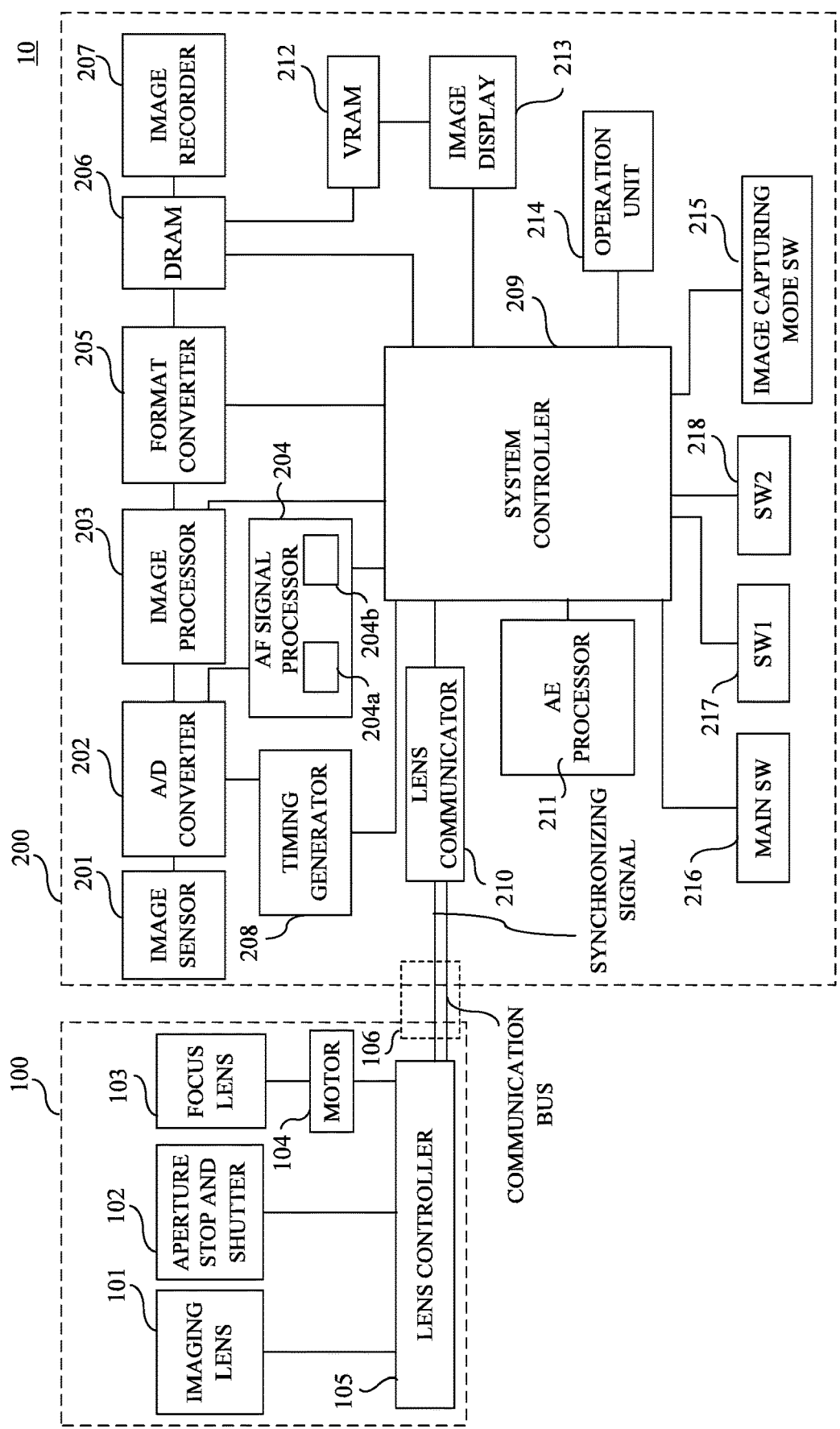
FIG. 1 is a block diagram of an image capturing apparatus in a first embodiment.

First, referring to FIG. 1, a configuration of an image capturing apparatus in a first embodiment of the present invention will be described. FIG. 1 is a block diagram of an image capturing apparatus 10 (lens interchangeable camera system) in this embodiment. The image capturing apparatus 10 includes a camera body 200 (image capturing apparatus body) and a lens apparatus 100 (interchangeable lens) detachable from the camera body 200. The lens apparatus 100 is detachably (interchangeably) attached to the camera body 200 via a mount (not illustrated) including an electric contact unit 106. This embodiment can also be applied to an image capturing apparatus where a lens apparatus and a camera body are integrally configured.

Reference numeral 101 denotes an imaging lens including a zoom mechanism, reference numeral 102 denotes an aperture stop and shutter that controls a light intensity, reference numeral 103 denotes a focus lens 103 for focusing on an image sensor 201 described below, reference numeral 104 denotes a motor that drives the focus lens 103, and reference numeral 105 denotes a lens controller. Reference numeral 201 denotes an image sensor as a light receiver (photoelectric converter) that converts reflected light from an object into an electric signal. Reference numeral 202 denote an A/D converter including a CDS circuit that removes an output noise of the image sensor 201 and a nonlinear amplification circuit that performs amplification before the A/D conversion. Reference numeral 203 denotes an image processor, reference numeral 204 denotes an AF signal processor, and reference numeral 205 denotes a format converter. In this embodiment, the AF signal processor 204 includes an acquirer 204a and a calculator 204b.

Reference numeral 206 denotes a high-speed built-in memory (DRAM) such as a random access memory (RAM), and it is used as a high-speed buffer as a temporary image memory unit or as a work memory in compressing and expanding an image.

Reference numeral 207 denotes an image recorder including a recording medium such as a memory card and its interface, and reference numeral 208 denotes a timing generator. Reference numeral 209 denotes a system controller that controls a system such as an image capturing sequence, reference numeral 210 denotes a lens communicator that communicates between the camera body 200 and the lens apparatus 100, reference numeral 211 denotes an AE processor, and reference numeral 212 denotes an image display memory (VRAM). Reference numeral 213 denotes an image display that displays a captured image (screen) and a focus detection area in photographing, in addition to display of an image, display for assisting an operation, and display of a camera state.

Reference numeral 214 denotes an operation unit for the user to operate the camera body 200, and it includes a menu switch for performing various settings such as a photographing function of the image capturing apparatus 10 and setting for image reproduction, an operation mode switch for switching an image capturing mode and a reproduction mode, and the like. Reference numeral 215 denotes an image capturing mode switch for selecting an image capturing mode such as a macro mode and a sports mode. Reference numeral 216 denotes a main switch for turning on the power to the system (image capturing apparatus 10). Reference numeral 217 denotes a switch (SW1) for performing a photographing standby operation such as AF and AE, and reference numeral 218 denotes a switch (SW2) for photographing after the operation of the switch SW1.

The image sensor 201 includes a CCD sensor, a CMOS sensor, and the like, and it photoelectrically converts an object image (optical image) formed via the image capturing optical system of the lens apparatus 100 to output a pixel signal (image data). That is, a light beam incident from the image capturing optical system forms an image on a light receiving surface of the image sensor 201, and it is converted into signal charges depending on an incident light intensity by the pixels (photodiodes) arrayed in the image sensor 201. The signal charges accumulated in the respective photodiodes are sequentially read from the image sensor 201 as voltage signals depending on the signal charges based on a drive pulses output from the timing generator 208 in accordance with commands from the system controller 209.

Each pixel of the image sensor 201 used in this embodiment includes two (a pair) of photodiodes A and B and one microlens that is provided for the pair of photodiodes A and B (that shares the photodiodes A and B). That is, the image sensor 201 includes the pair of photodiodes (first photoelectric converter and second photoelectric converter) for one microlens, and a plurality of microlenses are arrayed in two dimensions. Each pixel divides incident light by the microlens to form a pair of optical images on the pair of photodiodes A and B to output, from the pair of photodiodes A and B, a pair of pixel signals (A image signal and B image signal) that are used as AF signals described below. Further, by adding the outputs of the pair of photodiodes A and B, it is possible to obtain an imaging signal (A+B image signal).

By combining a plurality of A image signals and a plurality of B image signals respectively output from a plurality of pixels, a pair of image signals as AF signals (focus detection signals) used for AF by the imaging-plane phase difference detection method (imaging-plane phase difference AF) are obtained. The AF signal processor 204, which will be described below, performs a correlation calculation on the pair of image signals to calculate a phase difference (image shift amount) which is a deviation amount of the pair of image signals, and further calculates a defocus amount (and a defocus direction) of the image capturing optical system based on the image shift amount.

As described above, the image sensor 201 photoelectrically converts the optical image formed by receiving the light beam passing through the image capturing optical system of the lens apparatus 100 into an electric signal to output image data (image signal). The image sensor 201 of this embodiment is provided with two photodiodes for one microlens, and it is possible to generate an image signal used for focus detection by the imaging-plane phase difference AF method. The number of photodiodes (divided PDs) that share one microlens may be changed, such as providing four photodiodes for one microlens.

FIG. 2A schematically illustrates a configuration example of pixels which does not support the imaging-plane phase difference AF method, and FIG. 2B schematically illustrates a configuration example of pixels which support the imaging-plane phase difference AF method. In each of FIGS. 2A and 2B, the Bayer array is used, and symbol R denotes a red color filter, symbol B denotes a blue color filter, and symbols Gr and Gb denote green color filters. In the pixel configuration of FIG. 2B which supports the imaging-plane phase difference AF, two photodiodes A and B divided into two in a horizontal direction of FIG. 2B are provided in one pixel (pixel indicated by a solid line) in the pixel configuration which does not support the imaging-plane phase difference AF method illustrated in FIG. 2A. The photodiodes A and B (first photoelectric converter and second photoelectric converter) receive the light beams passing through different pupil regions of the image capturing optical system. As described above, since the photodiode A and the photodiode B receive the light beams passing through different regions of an exit pupil of the image capturing optical system, the B image signal has parallax with respect to the A image signal. Further, one of the image signals (A image signal or B image signal) of the imaging signal (A+B image signal) and the pair of parallax image signals has parallax. The pixel dividing method illustrated in FIG. 2B is an example, and other configurations such as a configuration where the pixel is divided in the vertical direction of FIG. 2B, a configuration where the pixel is divided into two in each of the horizontal direction and the vertical direction (a total of four divisions) may be adopted. Further, plural types of pixels divided by different division methods within the same image sensor may be included.

In this embodiment, a plurality of photoelectric converters are arranged for one microlens, and a pupil-divided light beam is incident on each photoelectric converter, but the present invention is not limited to this configuration. For example, the configuration of the focus detection pixel may have a configuration in which one PD is provided under the microlens and the pupil division is performed by shielding left and right or upper and lower sides with a light shielding layer. Alternatively, a pair of focus detection pixels may be discretely arranged in an array of a plurality of imaging pixels, and a pair of image signals may be acquired from the pair of focus detection pixels.

The imaging signal and the AF signal read from the image sensor 201 are input to the A/D converter 202. The A/D converter 202 performs correlated double sampling for removing a reset noise, gain adjustment, and digitization with respect to the imaging signal and the AF signal. The A/D converter 202 outputs the imaging signal to the image processor 203, and it outputs the AF signal to the AF signal processor 204.

The AF signal processor 204 (acquirer 204a) acquires the AF signals (the first signal (A image signal) and the second signal (B image signal) as a pair of image signals) output from the A/D converter 202. Further, the AF signal processor 204 (calculator 204b) calculates the image shift amount by performing the correlation calculation based on the AF signals to calculate the defocus amount based on the image shift amount. In addition, the AF signal processor 204 (calculator 204b) calculates reliability information (degree of coincidence of the two images, steepness (sharpness) of the two images, contrast information, saturation information, scratch information, or the like) of AF signals. The defocus amount and reliability information (reliability) calculated by the AF signal processor 204 are output to a system controller 209. The details of the correlation calculation by the AF signal processor 204 will be described below.

Figure 3:
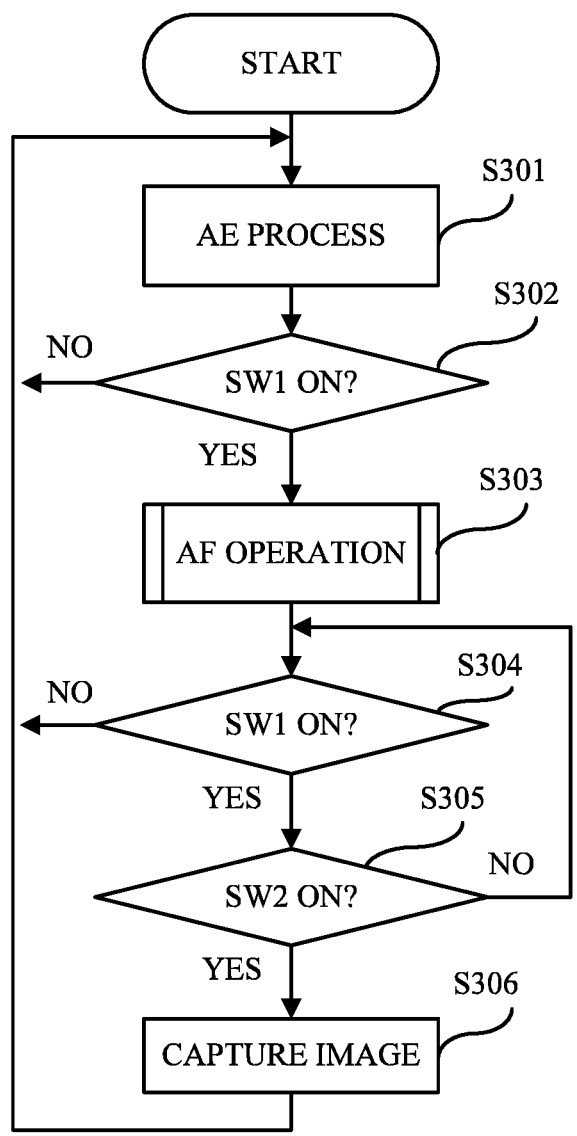
FIG. 3 is a flowchart of illustrating an operation of the image capturing apparatus in the first embodiment.

Next, referring to FIG. 3, an operation of the image capturing apparatus 10 in this embodiment will be described. FIG. 3 is a flowchart illustrating the operation of the image capturing apparatus 10. Each step of FIG. 3 is mainly performed by each unit based on a command from the system controller 209.

First, at step S301, the system controller 209 controls the AE processor 211 so as to perform an AE process on the output signal of the image processor 203. Subsequently, at step S302, the system controller 209 determines whether the switch 217 (SW1) is ON. When the switch 217 (SW 1) is ON, the flow proceeds to step S303. On the other hand, when the switch 217 (SW1) is OFF, the flow returns to step S301.

At step S303, the system controller 209 performs an AF operation. Details of the AF operation will be described below. Subsequently, at step S304, the system controller 209 determines whether the switch 217 (SW1) is ON. When the switch 217 (SW1) is ON, the flow proceeds to step S305. On the other hand, when the switch 217 (SW1) is OFF, the flow returns to step S301.

At step S305, the system controller 209 determines whether the switch 218 (SW2) is ON. When the switch 218 (SW2) is OFF, the flow returns to step S304. On the other hand, when the switch 218 (SW2) is ON, the flow proceeds to step S306. At step S306, the system controller 209 captures an image. Then, the flow returns to step S301.

Figure 4:
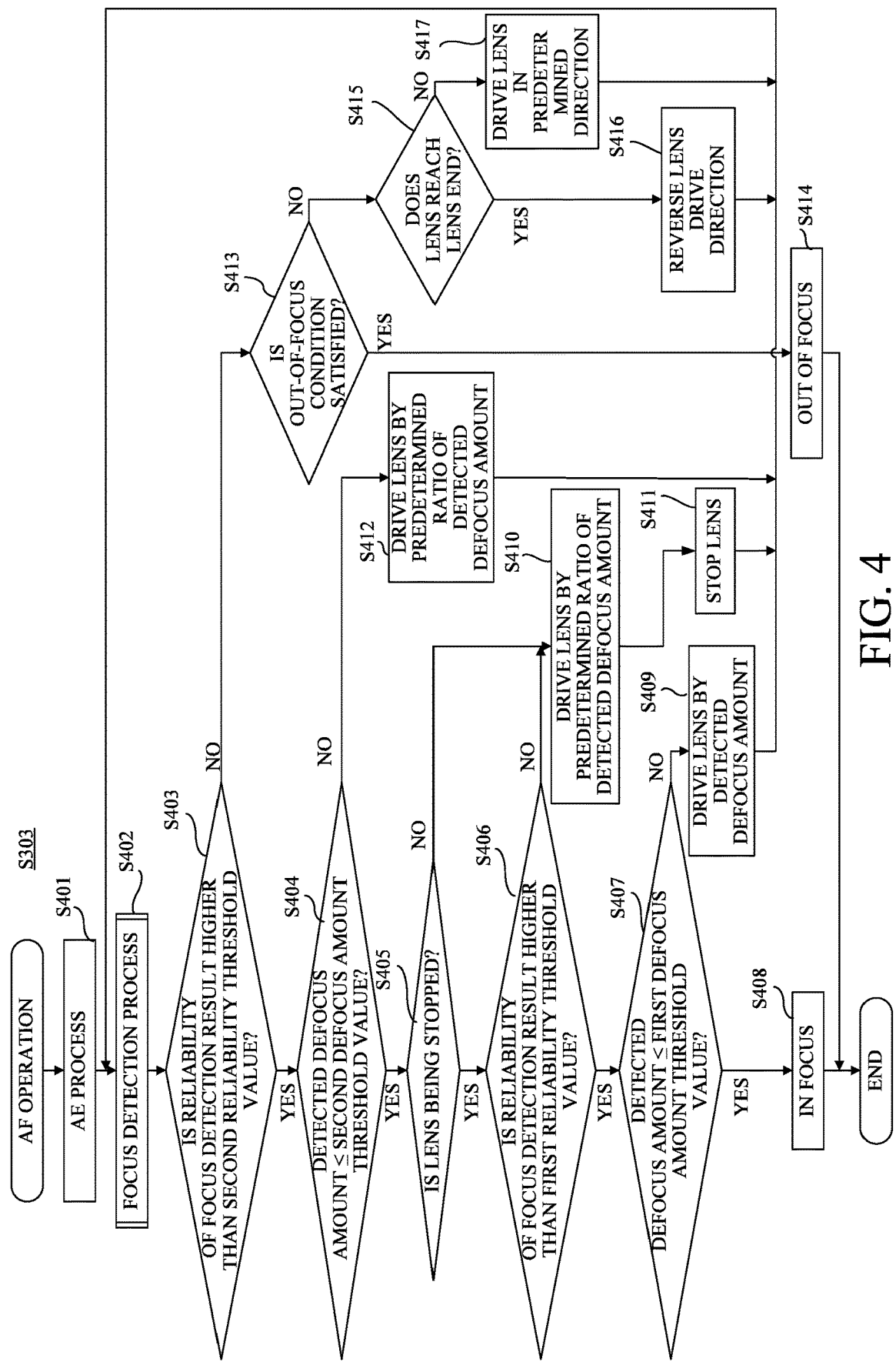
FIG. 4 is a flowchart of illustrating an AF operation in the first embodiment.

Next, referring to FIG. 4, the AF operation (step S303 in FIG. 3) in this embodiment will be described in detail. FIG. 4 is a flowchart illustrating the AF operation. Each step of FIG. 4 is mainly performed by the AF signal processor 204 and the system controller 209.

First, at step S401, the system controller 209 controls the AE processor 211 so as to perform the AE process on the output signal of the image processor 203. Subsequently, at step S402, the AF signal processor 204 performs a focus detection process by using the pair of image signals to calculate the defocus amount and the reliability. Details of the focus detection process will be described below.

Subsequently, at step S403, the system controller 209 determines whether the reliability (reliability of the focus detection result) calculated at step S402 is higher than a preset second reliability threshold value. When the reliability is higher than the second reliability threshold value, the flow proceeds to step S404. On the other hand, when the reliability is less than the second reliability threshold value, the flow proceeds to step S413. The second reliability threshold value is set to a value where the focus position direction of the object can be guaranteed but the accuracy of the defocus amount cannot be guaranteed if the reliability is lower than the second reliability threshold value.

At step S404, the system controller 209 determines whether the defocus amount (detected defocus amount) calculated at step S402 is smaller than or equal to a preset second defocus amount threshold value. When the detected defocus amount is smaller than or equal to the second defocus amount threshold, the flow proceeds to step S405. On the other hand, when the detected defocus amount is larger than the second defocus amount threshold value, the flow proceeds to step S412. When the defocus amount is smaller than or equal to the second defocus amount threshold value, the second defocus amount threshold value is set to a controllable value (for example, five times the depth of focus) so that the focus lens 103 moves by a lens drive by the defocus amount in the depth of focus within the predetermined number of times (for example three times).

At step S405, the system controller 209 determines whether the focus lens 103 is in a stop state (i.e., whether the focus lens 103 is stopped). When the focus lens 103 is stopped, the flow proceeds to step S406. On the other hand, when the focus lens 103 is not stopped, the flow proceeds to step S410.

At step S406, the system controller 209 determines whether the reliability (the reliability of the focus detection result) calculated at step S402 is higher than a preset first reliability threshold value. When the reliability is higher than the first reliability threshold value, the flow proceeds to step S407. On the other hand, when the reliability is lower than the first reliability threshold value, the flow proceeds to step S410. The first reliability threshold value is set so that the variation of the accuracy of the defocus amount is within a predetermined range (for example, within the depth of focus) if the reliability is higher than or equal to the first reliability threshold value.

At step S407, the system controller 209 determines whether the defocus amount (detected defocus amount) calculated at step S402 is smaller than or equal to a preset first defocus amount threshold value. When the detected defocus amount is smaller than or equal to the first defocus amount threshold value, the flow proceeds to step S408. On the other hand, when the detected defocus amount is larger than the first defocus amount threshold value, the flow proceeds to step S409. When the detected defocus amount is smaller than or equal to the first defocus amount threshold value, the first defocus amount threshold value is set so that the focus lens 103 is controlled within the depth of focus.

At step S408, the system controller 209 determines that the focus state is the in-focus state, and then the flow is finished. On the other hand, at step S409, the system controller 209 drives the focus lens 103 by the defocus amount (detected defocus amount) calculated at step S402, and then the flow returns to step S402. By performing the series of operations at step S405 to S409, the system controller 209 can calculate the defocus amount again while the focus lens 103 is stopped when the reliability calculated at step S402 is higher than the first reliability threshold value.

At step S410, the system controller 209 drives the focus lens 103 by a predetermined ratio with respect to the defocus amount detected at step S402. Subsequently, at step S411, the system controller 209 outputs an instruction to stop the focus lens 103 and then the flow returns to step S402.

At step S412, the system controller 209 drives the focus lens 103 by a predetermined ratio with respect to the defocus amount detected at step S402, and then the flow returns to step S402. The predetermined ratio is set (for example, 80%) such that a drive amount (lens drive amount) of the focus lens 103 is smaller than the defocus amount. Further, the set lens speed is set to be slower than a drivable speed by the set drive amount, for example in a time of one frame. Thus, when the detected defocus amount is incorrect, it is possible to avoid exceeding the focus position of the object. In addition, it is possible to drive the next lens while driving the focus lens 103 without stopping it (overlap control).

At step S413, the system controller 209 determines whether an out-of-focus condition is satisfied. When the out-of-focus condition is satisfied, the flow proceeds to step S414. On the other hand, when the out-of-focus condition is not satisfied, the flow proceeds to step S415. The out-of-focus condition is a condition for determining that there is no object to be focused by the system controller 209. As the out-of-focus condition, for example, a condition in which the lens drive is completed over all the movable range of the focus lens 103, that is, a condition in which the focus lens 103 detects both lens ends on the far side and the near side is set and then it returns to the initial position is set.

At step S414, the system controller 209 determines that the focus state is in the out-of-focus state, and then the flow is finished. On the other hand, at step S415, the system controller 209 determines whether the focus lens 103 has reached the lens end on the far side or near side. When the focus lens 103 has reached the end of the lens, the flow proceeds to step S416, and on the other hand, when the focus lens 103 has not reached the end of the lens, the flow proceeds to step S417.

At step S416, the system controller 209 inverts the drive direction (lens drive direction) of the focus lens 103, and then the flow returns to step S402. At step S417, the system controller 209 drives the focus lens 103 in a predetermined direction, and then the flow returns to step S402. The drive speed (focus lens speed) of the focus lens 103 is set to the highest speed within the range of the lens speed such that the focus lens 103 does not pass the focus position at the time when the defocus amount can be detected.

Figure 5:
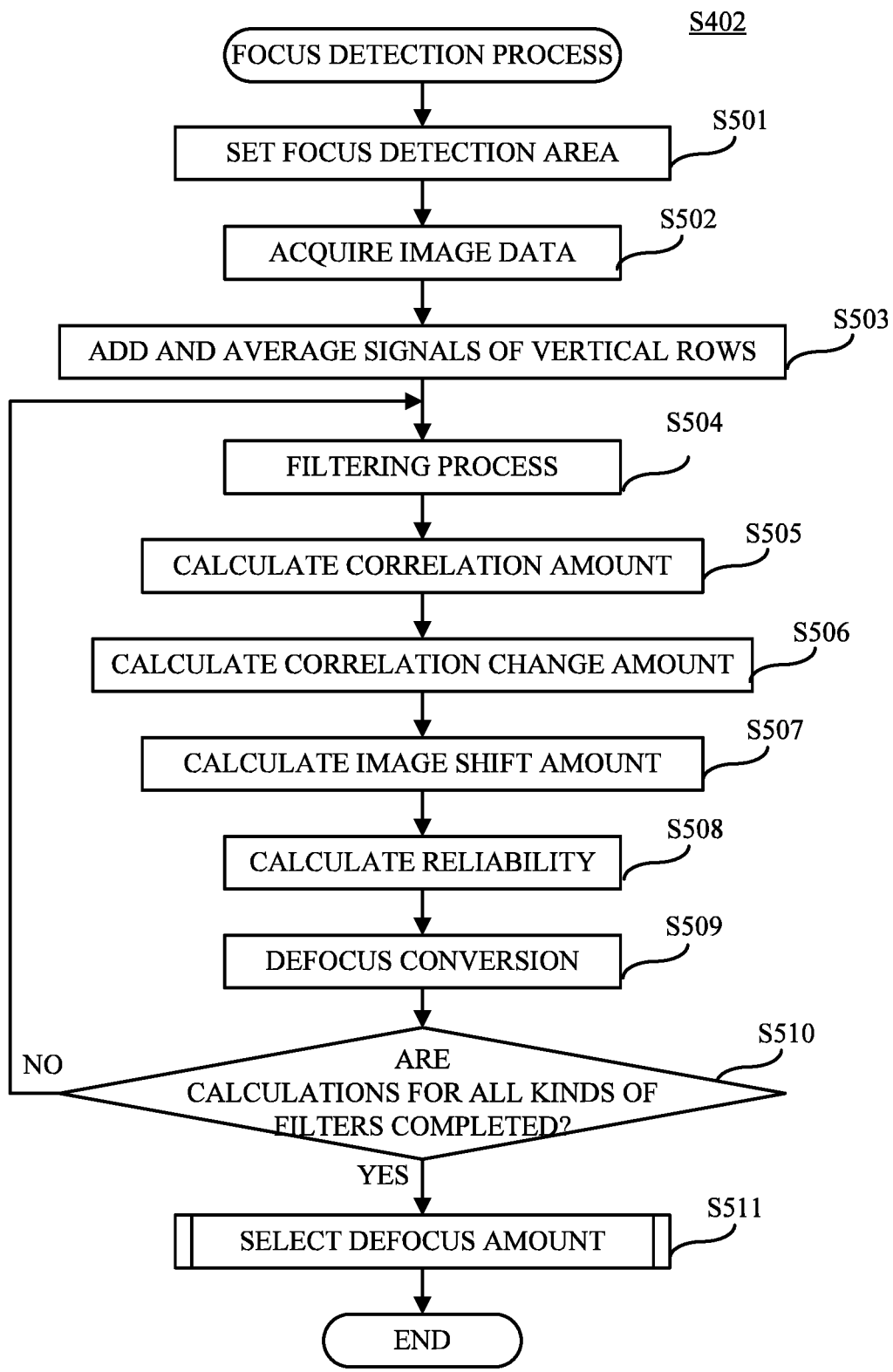
FIG. 5 is a flowchart of illustrating a focus detection process in the first embodiment.

Next, referring to FIG. 5, the focus detection process (step S402 in FIG. 4) will be described in detail. FIG. 5 is a flowchart illustrating the focus detection process. Each step of FIG. 5 is mainly performed by the system controller 209 or the AF signal processor 204 based on a command from the system controller 209.

First, at step S501, the AF signal processor 204 (system controller 209) sets a focus detection area in an arbitrary range in the image sensor 201. Subsequently, at step S502, the AF signal processor 204 acquires a pair of image signals (A image signal and B image signal) for focus detection from the image sensor 201 with respect to the focus detection area set at step S501. Subsequently, at step S503, the AF signal processor 204 performs a row adding and averaging process in the vertical direction on the pair of image signals acquired at step S502. By the row adding and averaging process, the influence of the noise of the image signal can be reduced. Subsequently, at step S504, the AF signal processor 204 performs a filtering process for extracting a signal component in a predetermined frequency band from the pair of image signals where the row adding and averaging process has been performed at step S503.

Subsequently, at step S505, the AF signal processor 204 calculates a correlation amount based on the pair of image signals where filtering process has been performed at step S504. Subsequently, at step S506, the AF signal processor 204 calculates a correlation change amount based on the correlation amount calculated at step S505. Subsequently, at step S507, the AF signal processor 204 calculates an image shift amount based on the correlation change amount calculated at step S505. Subsequently, at step S508, the AF signal processor 204 calculates a reliability of the image shift amount calculated at step S507. Subsequently, at step S509, the AF signal processor 204 converts the image shift amount into a defocus amount.

Subsequently, at step S510, the system controller 209 determines whether calculation has been performed with respect to all the filters (all the types of filters) for the filtering process performed at step S504. When the calculation of the filtering process is completed for all the types of filters, the flow proceeds to step S511. On the other hand, when the calculation of the filtering process is not completed for at least one of the types of filters, the flow returns to step S504. In this embodiment, in the filtering process of step S504, the processes (filtering processes) using bandpass filters with different bands of three frequency bands (low frequency band, middle frequency band, and high frequency band) are performed on for example the pair of image signals where the row adding and averaging process has been performed in the horizontal direction. However, the low-pass filter, the mid-pass filter, and the high-pass filter indicate relative high and low of frequency components taken out by the respective filters, and they do not indicate absolute high and low. At step S510, the system controller 209 determines whether the series of processes at step S504 to S509 has been performed for all the three frequency bands.

At step S511, the system controller 209 selects a defocus amount. That is, the system controller 209 (determiner) selects (determines) a combination of the defocus amount and the reliability from the three combinations of the defocus amounts and the reliabilities calculated by the series of processes at step S504 to S509. In this embodiment, the defocus amount calculated using the low-pass filter is defined as large defocus, the defocus amount calculated using the middle band-pass filter is defined as middle defocus, and the defocus amount calculated using the high-pass filter is defined as small defocus. The selection of the defocus amount will be described below.

Figure 6:
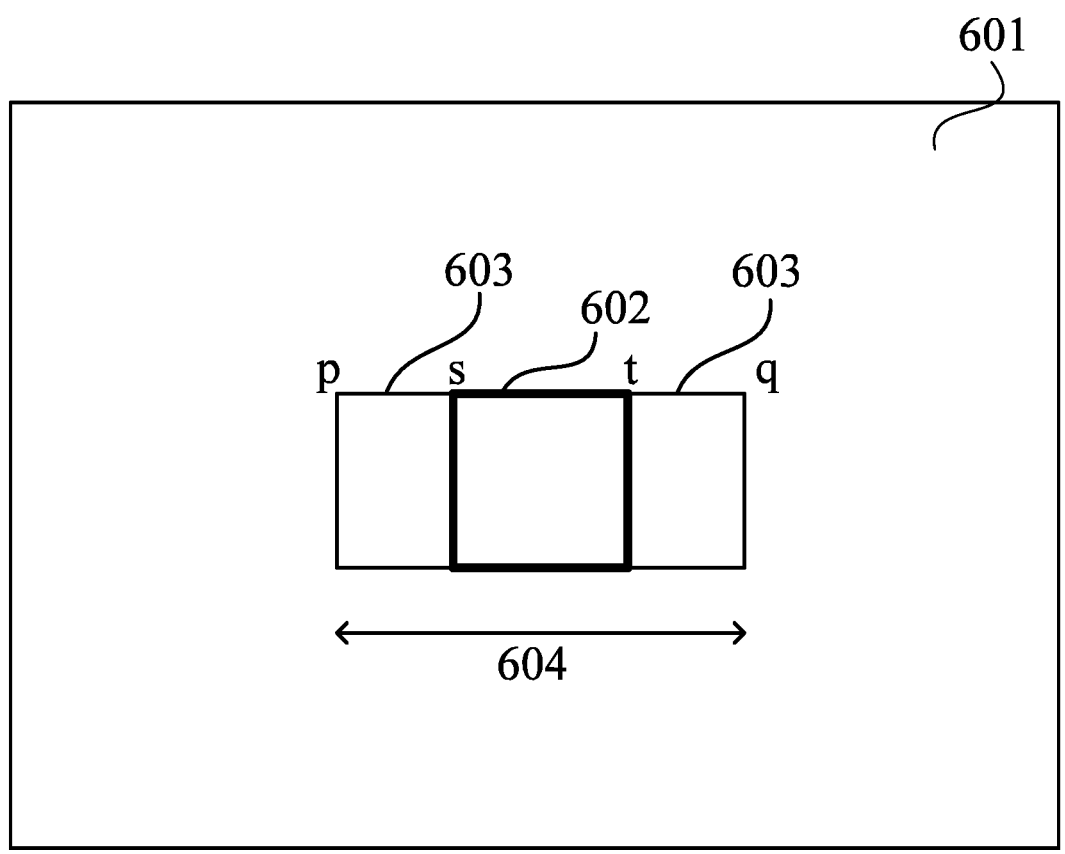
FIG. 6 is an explanatory diagram of a focus detection area in the first embodiment.

Next, referring to FIG. 6, the focus detection area (AF area) set at step S501 of FIG. 5 will be described in detail. FIG. 6 is an explanatory diagram of a focus detection area 602 on a pixel array 601 of the image sensor 201. Shift areas 603 on both sides of the focus detection area 602 are areas necessary for correlation calculation. Therefore, an area 604 that is a combination of the focus detection area 602 and the shift areas 603 is a pixel region necessary for correlation calculation. Symbols p, q, s, and t in FIG. 6 are coordinates in the horizontal direction (x axis direction), symbols p and q are respectively x coordinates of the start point and the end point of the area 604 (pixel area), and symbols s and t are respectively x coordinates of the start point and the end point of the focus detection area 602.

Figure 7A:
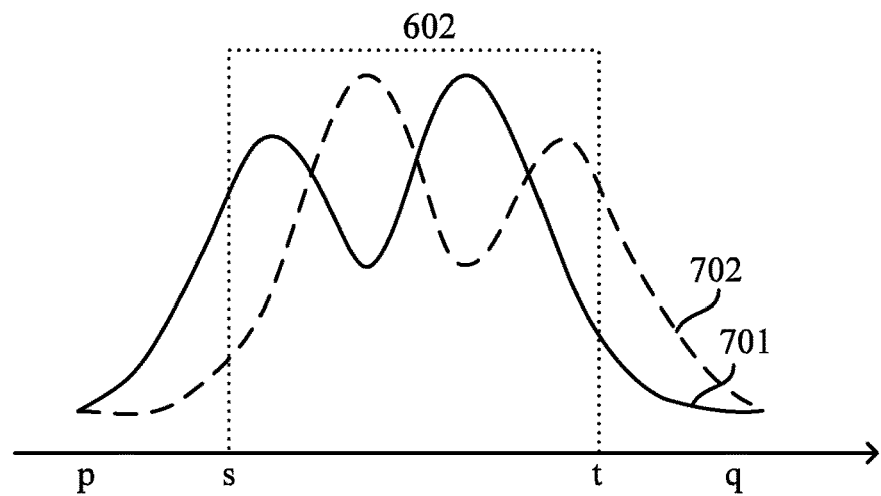
FIGS. 7A to 7C are explanatory diagrams of AF signals (a pair of image signals) in the first embodiment.
Figure 7B:
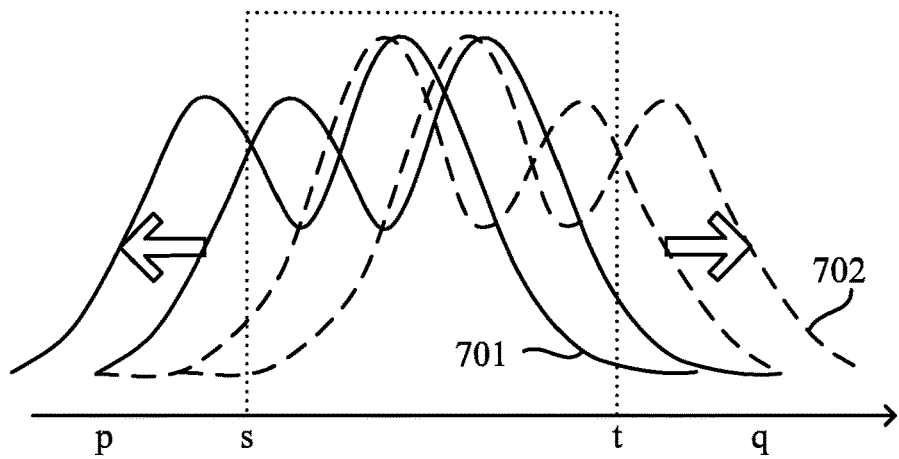
Figure 7C:
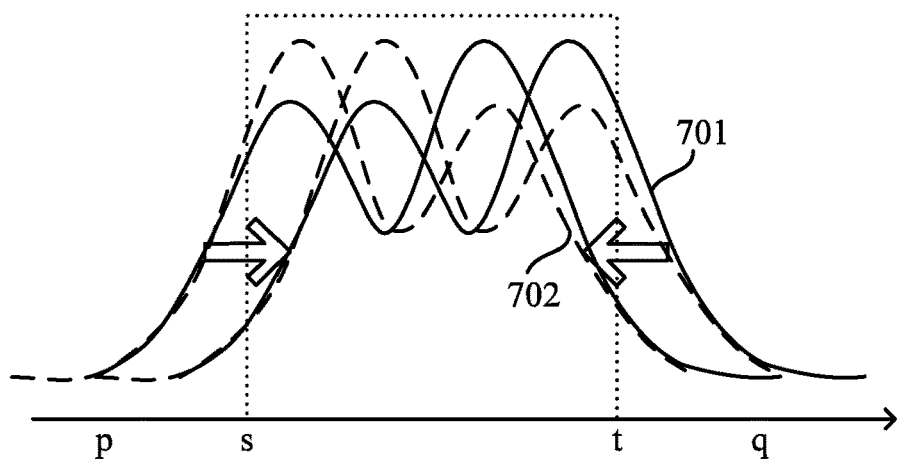

FIGS. 7A to 7C are explanatory diagrams of AF signals (a pair of image signals) acquired from a plurality of pixels included in the focus detection area 602 of FIG. 6. In each of FIGS. 7A to 7C, a solid line 701 is one (A image signal) of the pair of image signals, and a dashed line 702 is the other (B image signal) of the pair of image signals. FIG. 7A illustrates the A image signal and the B image signal before the shift, and FIGS. 7B and 7C illustrate the A image signal and the B image signal shifted from the state of FIG. 7A in a positive direction and a negative direction, respectively. When calculating the correlation amount of the pair of image signals (the A image signal indicated by the solid line 701 and the B image signal indicated by the broken line 702), both the A image signal and the B image signal are shifted by one bit in arrow directions.

Next, a method of calculating the correlation amount will be described. First, as illustrated in FIGS. 7B and 7C, each of the A image signal and the B image signal is shifted by one bit to calculate a sum of absolute values of differences between the A image signal and the B image signal. The correlation amount COR[i] can be calculated by using expression (1) below.

$$COR[i] = \sum_{k=x}^{y} |A[k+i] - B[k-i]| \quad (1)$$

$$\{(p-s) < i < (q-t)\}$$

In expression (1), symbol i is a shift amount, symbol p−s is a maximum shift amount in the negative direction, symbol q−t is a maximum shift amount in the positive direction, symbol x is a start coordinate of the focus detection area 602, and symbol y is an end coordinate.

Figure 8A:
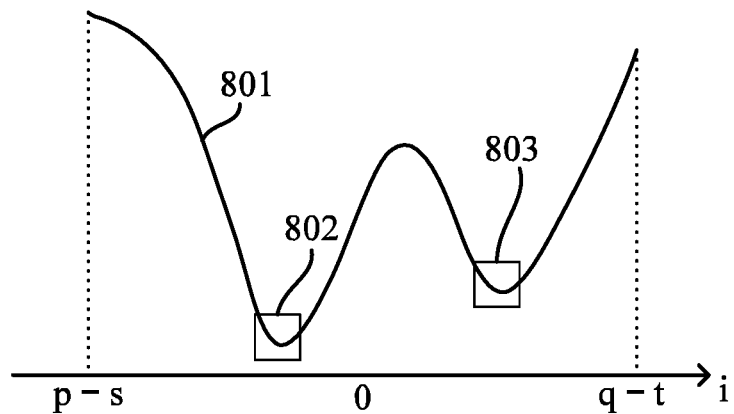
FIGS. 8A and 8B are explanatory diagrams of a relationship between a shift amount and a correlation amount of the AF signals in the first embodiment.
Figure 8B:
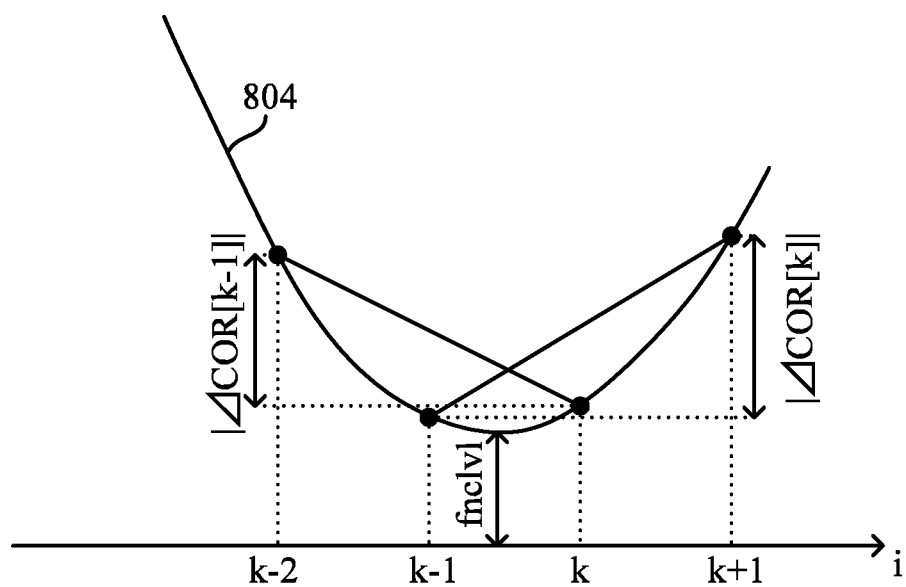

Referring to FIGS. 8A and 8B, a relationship between the shift amount and the correlation amount COR will be described. FIGS. 8A and 8B are explanatory diagrams of the relationship between the shift amount and the correlation amount COR. FIG. 8B is an enlarged view of an area 802 of FIG. 8A. In FIG. 8A, the horizontal axis represents the shift amount and the vertical axis represents the correlation amount COR. The degree of coincidence of the pair of image signals (the A image signal and the B image signal) is maximized in the shift amount corresponding to the smaller correlation amount out of the areas 802 and 803 near extreme values of a correlation amount 801 that changes with the shift amount.

Next, a method of calculating the correlation change amount will be described. In this embodiment, the difference in the correlation amount at every other shift in the waveform of the correlation amount 801 illustrated in FIG. 8A is calculated as the correlation change amount. The correlation change amount $\Delta COR[i]$ can be calculated by using expression (2) below.

$$\Delta COR[i] = COR[i-1] - COR[i+1]$$

$$\{(p-s+1) < i < (q-t-1)\} \quad (2)$$

Figure 9A:
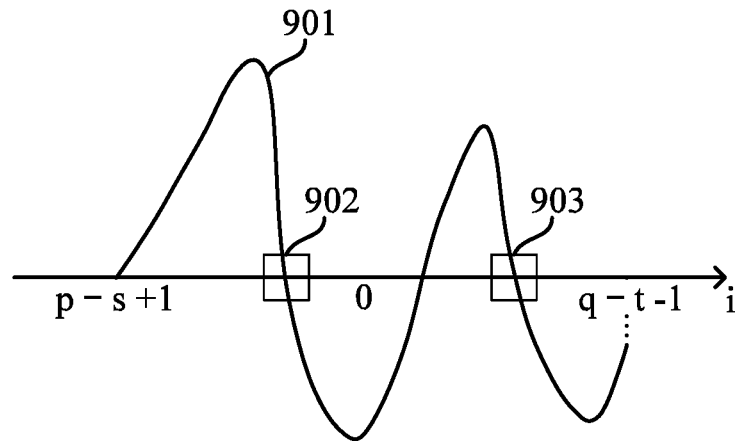
FIGS. 9A and 9B are explanatory diagrams of a relationship between the shift amount and a correlation change amount of the AF signals in the first embodiment.
Figure 9B:
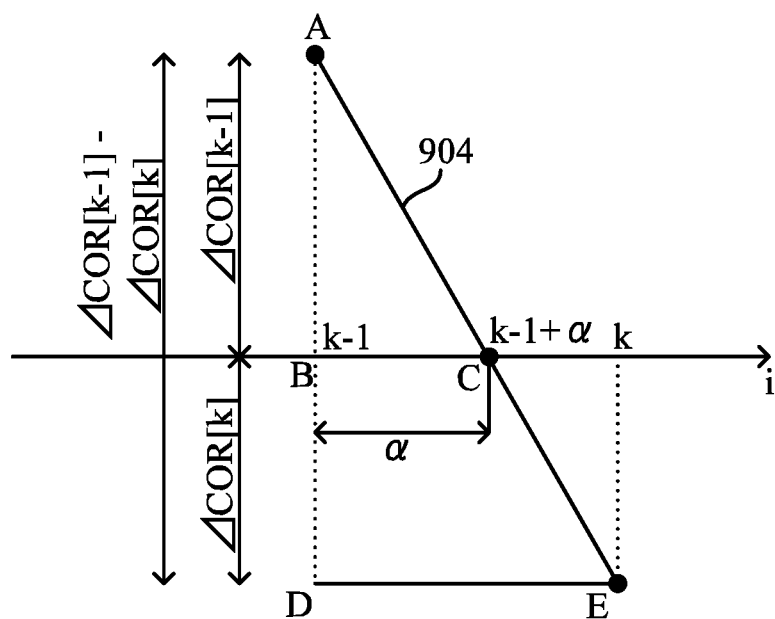

Referring to FIGS. 9A and 9B, the relationship between the shift amount and the correlation change amount $\Delta COR$ will be described. FIGS. 9A and 9B are explanatory diagrams of the relationship between the shift amount and the correlation change amount $\Delta COR$. FIG. 9B is an enlarged view of an area 902 of FIG. 9A. In FIG. 9A, the horizontal axis represents the shift amount and the vertical axis represents the correlation change amount $\Delta COR$. The correlation change amount 901 that changes with the shift amount becomes positive to negative in areas 902 and 903. A state in which the correlation change amount is zero is called zero cross, and the degree of coincidence between the pair of image signals (A image signal and B image signal) is maximized. Therefore, the shift amount giving the zero cross is the image shift amount.

In FIG. 9B, reference numeral 904 denotes a part of the correlation change amount 901. Referring to FIG. 9B, a method of calculating the image shift amount PRD will be described. The shift amount $(k-1+\alpha)$ that gives the zero cross is divided into an integer part $\beta(=k-1)$ and a decimal part $\alpha$. The decimal part $\alpha$ can be calculated from the similarity relationship between a triangle ABC and a triangle ADE in FIG. 9B by using expression (3) below.

$$AB:AD = BC:DE \quad (3)$$

$$\Delta COR[k-1]:\Delta COR[k-1] - \Delta COR[k] = \alpha:k-(k-1)$$

$$\alpha = \frac{\Delta COR[k-1]}{\Delta COR[k-1] - \Delta COR[k]}$$

According to FIG. 9B, the integer part $\beta$ can be calculated by using expression (4) below.

$$\beta = k-1 \quad (4)$$

That is, the image shift amount PRD can be calculated from the sum of the decimal part $\alpha$ and the integer part $\beta$. As illustrated in FIG. 9A, when a plurality of zero crosses of the correlation change amount $\Delta COR$ exist, the one with the greater steepness of the change in the correlation change amount $\Delta COR$ in the vicinity thereof is defined as a first zero cross. This steepness is an index representing the easiness of performing AF, and as the value is larger, it represents that it is easier to perform highly accurate AF. The steepness max$der$ can be calculated by using expression (5) below.

$$\max der = |\Delta COR[k-1]| + |\Delta COR[k]| \quad (5)$$

In this embodiment, when the plurality of zero crosses of the correlation change amount exist, the first zero cross is determined based on the steepness thereof, and the shift amount giving the first zero cross is set as the image shift amount.

Next, a method of calculating reliability information (reliability) of the image shift amount will be described. The reliability of the image shift amount can be defined by the degree of coincidence (degree of coincidence of two images) fnclvl of the pair of image signals (A image signal and B image signal) and the steepness of the correlation change amount $\Delta COR$ described above, and the reliability may be obtained from either value. The degree of coincidence of the two images is an index representing the accuracy of the image shift amount, and in this embodiment, the smaller the value, the better the accuracy. In FIG. 8B, reference numeral 804 denotes a part of the correlation amount 801. The degree of coincidence fnclvl of the two images can be calculated by using expression (6) below.

$$(i)\; fnclvl = COR[k-1] + \Delta COR[k-1]/4$$

$$(|\Delta COR[k-1]| \times 2 \leq \max der)$$

$$(ii)\; fnclvl = COR[k] - \Delta COR[k]/4$$

$$(|\Delta COR[k-1]| \times 2 > \max der) \quad (6)$$

Figure 10:
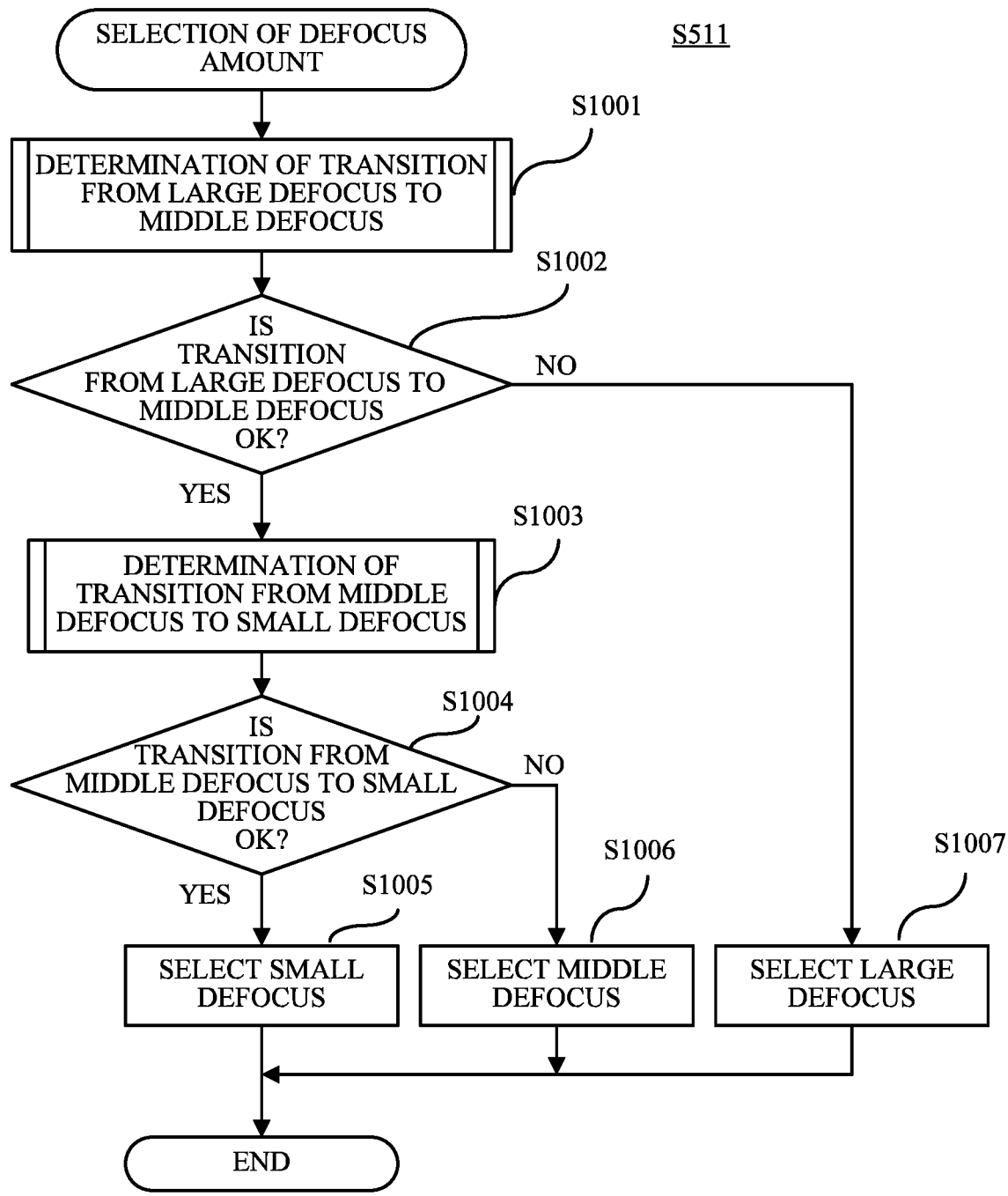
FIG. 10 is a flowchart of illustrating a selection of a defocus amount in the first embodiment.

Next, referring to FIG. 10, the selection of the defocus amount (step S511 in FIG. 5) will be described. FIG. 10 is a flowchart illustrating the selection of the defocus amount. Each step of FIG. 10 is mainly performed by the system controller 209.

First, at step S1001, the system controller 209 performs a determination of transition (i.e., takeover) from large defocus (first defocus amount) to middle defocus (second defocus amount) described below. Subsequently, at step S1002, the system controller 209 determines whether the transition from the large defocus to the middle defocus has been achieved. When the transition from the large defocus to the middle defocus has been achieved, the flow proceeds to step S1003. On the other hand, when the transition from the large defocus to the middle defocus has not been achieved, the flow proceeds to step S1007.

At step S1003, the system controller 209 performs a determination of transition (i.e., takeover) from the middle defocus (second defocus amount) to small defocus (third defocus amount) described below. Subsequently, at step S1004, the system controller 209 determines whether the transition from the middle defocus to the small defocus has been achieved. When the transition from the middle defocus to the small defocus has been achieved, the flow proceeds to step S1005. On the other hand, when the transition from the middle defocus to the small defocus has not been achieved, the flow proceeds to step S1006.

At step S1005, the system controller 209 selects the small defocus as a defocus amount to be used for drive (focus control) of the focus lens 103, and then the flow is finished. At step S1006, the system controller 209 selects the middle defocus as the defocus amount to be used for the focus control, and then the flow is finished. At step S1007, the system controller 209 selects the large defocus as the defocus amount used for the focus control, and then the flow is finished.

Figure 11:
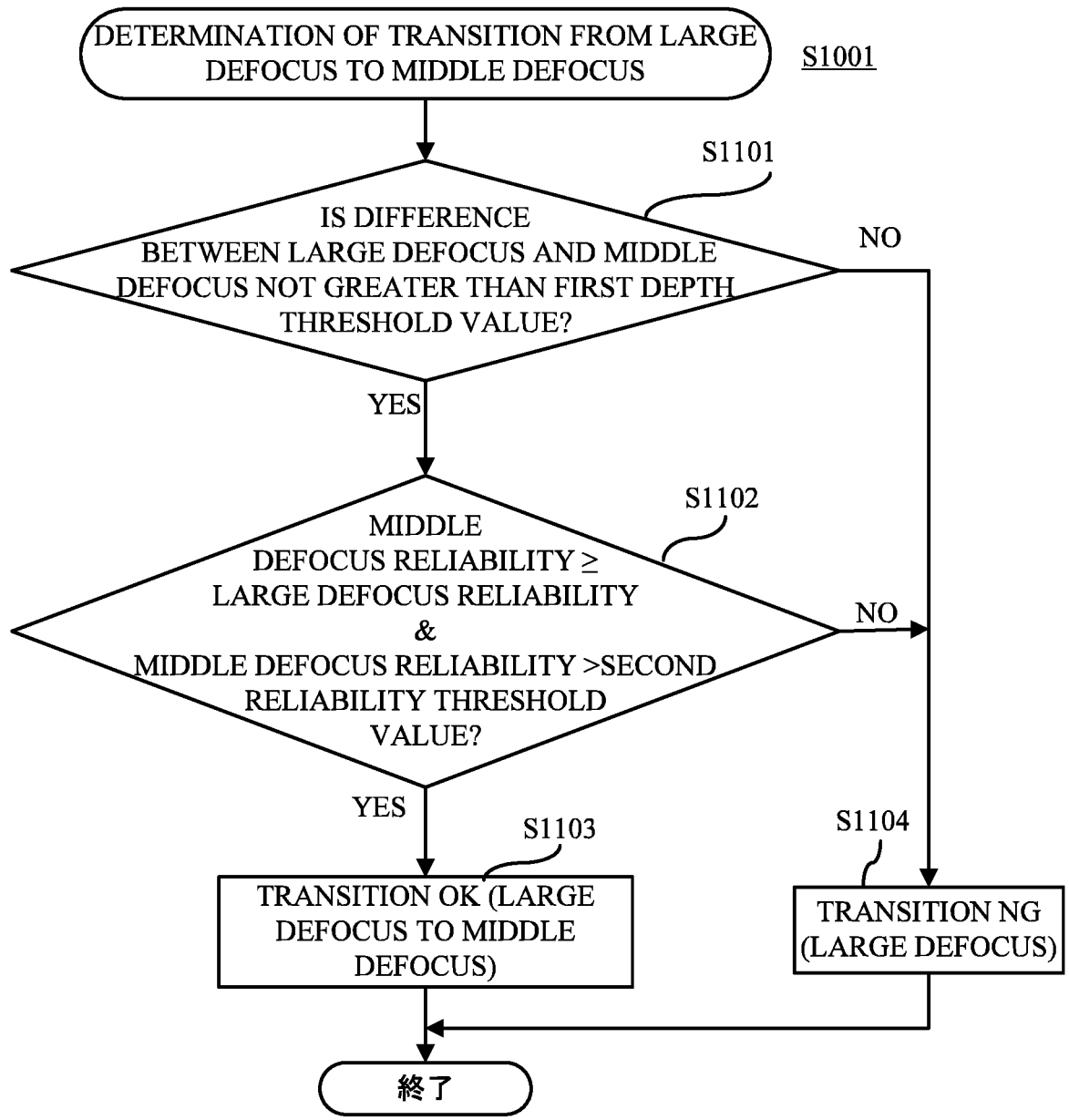
FIG. 11 is a flowchart of illustrating a determination of transition from a large defocus to a middle defocus in the first embodiment.

Next, referring to FIG. 11, a determination of transition (takeover) from the large defocus to the middle defocus (step S1001 in FIG. 10) will be described. Each step of FIG. 11 is mainly performed by the system controller 209.

At step S1101, the system controller 209 determines whether the difference between the defocus amounts of the large defocus and the middle defocus is less than or equal to a preset first depth threshold value (first threshold value). When the difference between the defocus amounts of the large defocus and the middle defocus is less than or equal to the first depth threshold value, the flow proceeds to step S1102. On the other hand, when the difference is greater than the first depth threshold value, the flow proceeds to step S1104. The first depth threshold value is set, for example, to nine times the depth of focus so that the transition from the large defocus to the middle defocus can be appropriately achieved. By setting the first depth threshold value based on the depth of focus (to be greater than the depth of focus), it is possible to set a uniform threshold value even when an F number or the focus detection area changes.

At step S1102, the system controller 209 determines whether the reliability of the middle defocus (second reliability) is higher than or equal to the reliability of the large defocus (first reliability) and the reliability of the middle defocus is higher than the second reliability threshold value (i.e., threshold value used in the determination at step S403 in FIG. 4). When both of these conditions are satisfied, the flow proceeds to step S1103. On the other hand, when at least one of the conditions is not satisfied, the flow proceeds to step S1104.

At step S1103, the system controller 209 determines that it is possible to achieve the transition from the large defocus to the middle defocus, and then the flow is finished. On the other hand, at step S1104, the system controller 209 determines that it is not possible to achieve the transition from the large defocus to the middle defocus, and then the flow is finished. As a result, in the process of moving the focus lens 103 from a large blur state (large defocus state) to a small blur state (small defocus state), the system controller 209 can determine whether the transition from the large defocus to the middle defocus can be achieved based on the difference between the defocus amounts of the large focus and the middle defocus and the respective reliabilities.

Figure 12:
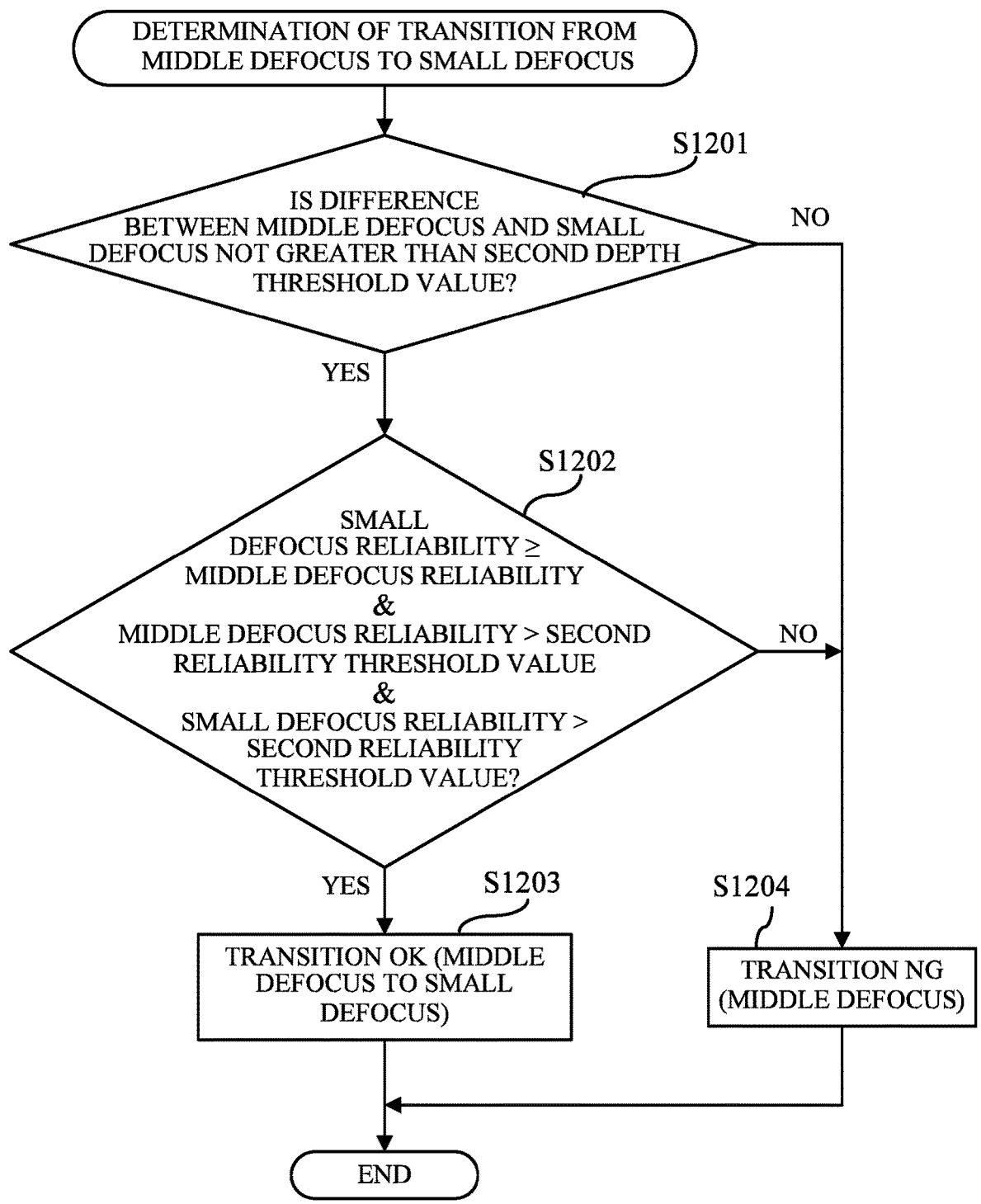
FIG. 12 is a flowchart of illustrating a determination of transition from a middle defocus to a small defocus in the first embodiment.

Next, referring to FIG. 12, the determination of transition (i.e., takeover) from the middle defocus to the small defocus (step S1003 in FIG. 10) will be described. Each step of FIG. 12 is mainly performed by the system controller 209.

At step S1201, the system controller 209 determines whether the difference between the defocus amounts of the middle defocus and the small defocus is less than or equal to a preset second depth threshold value (second threshold value). When the difference between the defocus amounts of the middle defocus and the small defocus is less than or equal to the second depth threshold value, the flow proceeds to step S1202. On the other hand, when the difference is greater than the second depth threshold value, the flow proceeds to step S1204. The second depth threshold value is set to, for example, three times the depth of focus so that the transition from the middle defocus to the small defocus can be appropriately achieved. By setting the second depth threshold value based on the depth of focus (to be greater than the depth of focus), it is possible to set a uniform threshold value even when the F number or the focus detection area changes. Further, the second depth threshold value is set to be smaller than the first depth threshold value used in the determination of step S1101 in FIG. 11. This is because the detection variation of the defocus amount increases as the defocus changes in order of the small defocus, the middle defocus, and the large defocus, and as a result the difference between the middle defocus and the large defocus is greater than the difference between the small defocus and the middle defocus.

At step S1202, the system controller 209 determines whether the reliability of the small defocus is higher than or equal to the reliability of the middle defocus and both the reliability of the small defocus and the reliability of the middle defocus are higher than the second reliability threshold value. When all these conditions are satisfied, the flow proceeds to step S1203. On the other hand, when at least one condition is not satisfied, the flow proceeds to step S1204.

At step S1203, the system controller 209 determines that it is possible to take over from the middle defocus to the small defocus, and then the flow is finished. On the other hand, at step S1204, the system controller 209 determines that it is not possible to take over from the middle defocus to the small defocus, and then the flow is finished. Accordingly, in the process of moving the focus lens 103 from the small blur state (small defocus state) to the in-focus position, the system controller 209 can determine whether the transition from the middle defocus to the small defocus is achieved based on the difference between the defocus amounts of the middle defocus and the small defocus and the respective reliabilities.

As described above, in this embodiment, the control apparatus includes the AF signal processor 204 (the acquirer 204a and the calculator 204b), and the determiner (the system controller 209). The acquirer acquires a first signal (A image signal) and a second signal (B image signal) corresponding to the light beams passing through different pupil areas of the image capturing optical system. The calculator performs a plurality of filtering processes (band-pass filtering processes) with different bands for the first signal and the second signal, and calculates the plurality of defocus amounts and the plurality of reliabilities based on the first and second signals where the respective filtering processes have been performed. The determiner determines the defocus amount to be used for focusing (focus control) from among the plurality of defocus amounts based on the difference between the plurality of defocus amounts and at least one of the plurality of reliabilities.

Preferably, the plurality of filtering processes includes a first filtering process for extracting the first and second signals with a first frequency band (low frequency band), and a second filtering process for extracting the first and second signals with a second frequency band (middle frequency band) higher than the first frequency band. The calculator calculates, as the plurality of defocus amounts and reliabilities, a first defocus amount (large defocus) and a first reliability (large defocus reliability) based on the first and second signals where the first filtering process has been performed. Further, the calculator calculates a second defocus amount (middle defocus) and a second reliability (middle defocus reliability) based on the first and second signals where the second filtering process has been performed. More preferably, when the difference between the first defocus amount and the second defocus amount is greater than a first threshold value (first depth threshold value), the calculator determines the first defocus amount as the defocus amount used for the focusing (S1101, S1104). More preferably, when the second reliability is higher than the first reliability and the second reliability is higher than a predetermined reliability threshold value (second reliability threshold value), the calculator determines the second defocus amount as the defocus amount used for the focusing. On the other hand, when the second reliability is lower than the first reliability or the second reliability is lower than the predetermined reliability threshold value (second reliability threshold value), the calculator determines the first defocus amount as the defocus amount used for the focusing (S1102 to S1104).

Preferably, the plurality of filtering processes include a third filtering process for extracting the first and second signals with a third frequency band (high frequency band) higher than the second frequency band. The calculator calculates a third defocus amount (small defocus amount) and a third reliability (small defocus reliability) based on the first and second signals where the third filtering process has been performed. More preferably, when the difference between the second defocus amount and the third defocus amount is greater than a second threshold value (second depth threshold value), the calculator determines the second defocus amount as the defocus amount used for the focusing (S1201, S1204). More preferably, when the third reliability is higher than the second reliability and each of the second reliability and the third reliability is higher than a predetermined reliability threshold value (second reliability threshold value), the calculator determines the third defocus amount as the defocus amount used for the focusing. On the other hand, when the third reliability is lower than the second reliability or the at least one of the second reliability and the third reliability is lower than the predetermined reliability threshold value, the calculator determines the second defocus amount as the defocus amount used for the focusing (S1202 to S1204). More preferably, the second threshold value is smaller than the first threshold value. Preferably, each of the first threshold value and the second threshold value is set based on the depth of focus (for example, greater than the depth of focus).

In this embodiment, in the process of moving the focus lens from the large blur state to the in-focus position, the defocus amount capable of determining the direction of the in-focus position is used in the large blur state, and the highly accurate defocus amount is used in the vicinity of the in-focus position. Therefore, according to this embodiment, it is possible to provide a control apparatus, an image capturing apparatus, a control method, and a non-transitory computer-readable storage medium which are capable of improving focusing accuracy and reducing a focusing time.

In this embodiment, the system controller 209 determines the defocus amount to be used for the focusing by using both the difference in defocus amount and the reliability of the defocus amount, but only one of them may be used to determine the defocus amount used for the focusing. That is, in the determination of transition from the large defocus to the middle defocus, step S1101 or step S1102 may be omitted to determine whether to use the large defocus or the middle defocus. Similarly, in the determination of transition from the middle defocus to the small defocus, step S1201 or step S1202 may be omitted to determine whether to use the middle defocus or the small defocus.

Second Embodiment

Next, a second embodiment of the present invention will be described.

When the object has a low contrast or the brightness is low, addition of a plurality of frames or lens movement a plurality of times is performed, thereby improving a focusing accuracy but increasing the time to focus. In a normal photographing, it is desirable to focus on the low contrast object or in the low brightness condition even if the AF time increases, but in some cases, it is desirable to prioritize reducing the time to focus over increasing the in-focus accuracy. For example, as a manual focus (MF) mode in which the user can manually specify the focus lens position to capturing an image, there is a function of assisting focusing by performing AF control in a minute range including the focus lens position specified by the user (safety MF). Since this function is an MF mode, it is desirable that the photographing time lag is not increased by the AF control.

Figure 14:
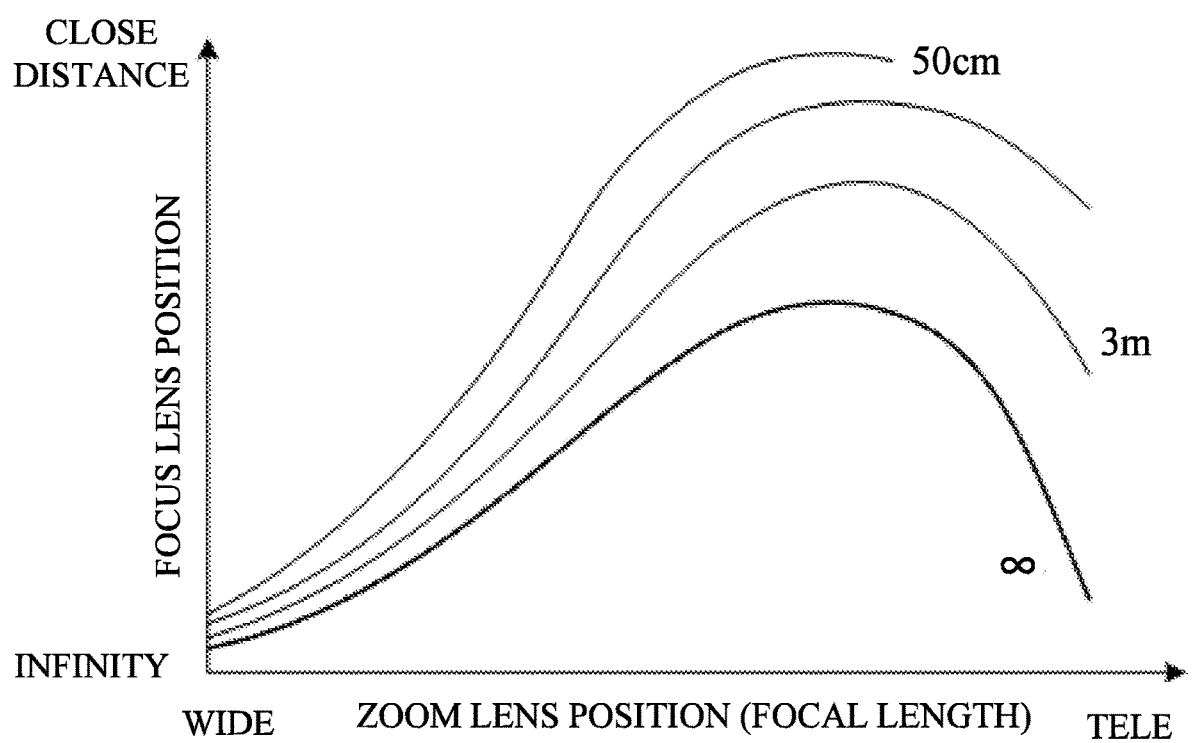
FIG. 14 is an explanatory diagram of a cam locus.

Further, when zooming from a wide-angle side to a telephoto side or from the telephoto side to the wide-angle side, the zoom lens and the focus lens are controlled to be driven so as to trace a cam locus according to an object distance, thereby obtaining a satisfactory image without defocus. However, as illustrated in FIG. 14, the cam locus for each object distance becomes dense as approaching the wide position. Therefore, when zooming from the wide-angle side to the telephoto side, it is not possible to accurately select the cam locus corresponding to the object distance, and there is a possibility that the initially selected cam locus deviates from the cam locus corresponding to the object distance. As a result, blurring occurs due to zooming. When detecting a defocus amount by the imaging-plane phase difference AF method, a method of adding image signals until a predetermined image signal value exceeds a threshold value is known, but in this method, the time to focus will increase.

Accordingly, in second to fourth embodiments, during a specific image capturing mode or a zoom operation, an image capturing apparatus capable of improving the focusing accuracy and reducing the AF time is provided by making the AF control different from that in the normal image capturing mode. In the second embodiment, a lens barrel-fastened image capturing apparatus where a lens barrel and an image capturing apparatus body are integrated will be described.

<Overall Structure>

Figure 13:
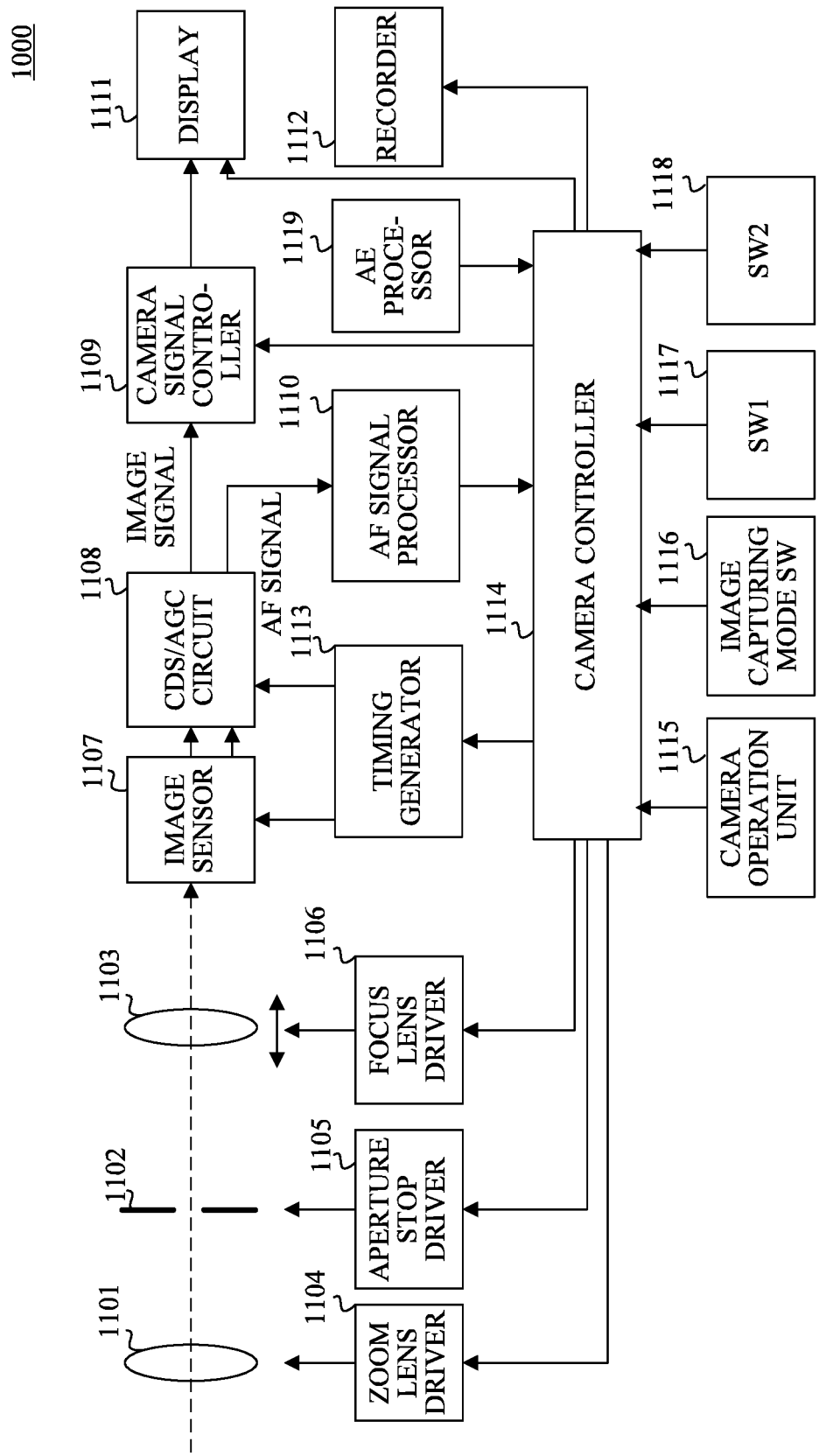
FIG. 13 is a block diagram of an image capturing apparatus in a second embodiment.

First, referring to FIG. 13, an example of the lens barrel-fastened image capturing apparatus in this embodiment will be described. FIG. 13 is a block diagram of an image capturing apparatus 1000 in this embodiment. As illustrated in FIG. 13, the lens barrel-fastened image capturing apparatus 1000 includes a camera controller 1114 as a center that controls the operations of the lens barrel and the entire image capturing apparatus. Each operation of the image capturing apparatus 1000 is performed based on a control program and various data necessary for control, which are stored in an internal ROM or RAM (not illustrated).

First, the configuration of portions related to the lens barrel will be described. The lens barrel includes a zoom lens 1101, an aperture stop 1102, a focus lens 1103, a zoom lens driver 1104, an aperture stop driver 1105, and a focus lens driver 1106. The zoom lens 1101 is driven by the zoom lens driver 1104 to change a focal length. The aperture stop 1102 is driven by the aperture stop driver 1105, and it controls an amount of light incident on an image sensor 1107 described below. The focus lens 1103 is driven by the focus lens driver 1106, and it performs focusing to form an image on the image sensor 1107 described below. The zoom lens driver 1104, the aperture stop driver 1105, and the focus lens driver 1106 are controlled by the camera controller 114, and they determine a position of the zoom lens 1101, an opening of the aperture stop 1102, and a position of the focus lens 1103, respectively. The camera controller 1114 obtains lens control information from the zoom lens driver 1104, the aperture stop driver 1105, and the focus lens driver 1106.

Next, the configuration of portions related to an image capturing function for acquiring an imaging signal from a light beam passing through the image capturing optical system will be described. The image capturing apparatus 1000 includes an image sensor 1107, a CDS/AGC circuit 1108, a camera signal processor 1109, an AF signal processor 1110, a display 1111, a recorder 1112, a camera controller 1114, and a camera operation unit 1115. Further, the image capturing apparatus 1000 includes an image capturing mode switch 1116 for selecting an image capturing mode such as a safety MF mode, a switch 1117 (SW1) for performing a photographing standby operation such as AF and AE, an image capturing switch 1118 (SW2) for photographing after the operation of SW1. Further, the image capturing apparatus 1000 includes an AE processor 1119.

The image sensor 107 is a member as an image sensor, and it includes a CCD sensor, a CMOS sensor, or the like. The light beam passing through the image capturing optical system of the lens barrel is imaged on a light receiving surface of the image sensor 107 to be converted into signal charges corresponding to an amount of incident light by a photodiode. The signal charges accumulated in each photodiode are sequentially read from the image sensor 1107 as a voltage signal corresponding to the signal charges on the basis of a drive pulse supplied from a timing generator 1113 in accordance with a command from the camera controller 1114. A video signal and an AF signal read from the image sensor 107 are sampled and input to the CDS/AGC circuit 1108 that performs a gain adjustment, and it outputs the video signal to the camera signal processor 1109 and the signal for the imaging-plane phase difference to the AF signal processor 1110.

The camera signal processor 1109 performs various image processing on the signal output from the CDS/AGC circuit 1108 to generate a video signal. A display 1111 including an LCD or the like displays the video signal output from the camera signal processor 1109 as a captured image. The recorder 1112 records the video signal from the camera signal processor 1109 on a recording medium such as a magnetic tape, an optical disk, a semiconductor memory, or the like.

The AF signal processor 1110 performs a correlation calculation based on two image signals for AF output from the CDS/AGC circuit 1108 to calculate the defocus amount and reliability information (degree of coincidence of the two images, steepness (sharpness) of the two images, contrast information, saturation information, scratch information, or the like). Then, the AF signal processor 1110 outputs the calculated defocus amount and reliability information to the camera controller 1114. In addition, the camera controller 114 notifies the AF signal processor 110 of a change of the setting for the calculation based on the acquired defocus amount and reliability information. The details of the defocus amount calculation are as described in the first embodiment referring to FIGS. 5 to 9.

The camera controller 1114 performs control by communicating information with the entire image capturing apparatus 1000. In addition to the processes in the image capturing apparatus 1000, in response to an input from the camera operation unit 1115, it performs operations of various camera functions operated by a user, such as turning on/off the power supply, changing the setting, starting the recording, starting the AF control, and confirming the recorded image.

<Reliability of Focus Detection Result>

Next, the reliability of the focus detection result in this embodiment will be described. As in the first embodiment, this embodiment also acquires the reliability from at least one of the degree of coincidence fnclvl of two images and the steepness of the correlation change amount ΔCOR. In this embodiment, the reliability is calculated by the AF signal processor 1110 illustrated in FIG. 13. When the calculated defocus amount can be determined to be reliable, the reliability is high and the reliability decreases as it becomes unreliable. The reliability in this embodiment is represented by numerical values from 1 to 4, indicates the highest reliability, and "4" indicates the lowest reliability. Details of each reliability are as follows.

The case where the reliability is "1" means that the contrast of the A image signal and the contrast of the B image signal are high and shapes of the A image signal and the B image signal are similar (i.e., level of the degree of coincidence of the two image is high) or the focus lens is in the in-focus state with respect to a main object image. In this case, the drive is performed on the assumption that the defocus amount is reliable.

The case where the reliability is "2" means that the contrast of the A image signal and the B image signal is high although the reliability is not "1", and the shapes of the A image signal and the B image signal are similar or the focus lens is already located in the vicinity of the in-focus position within a certain error range with respect to the main object image. In this case, a target position is determined to be driven based on the defocus amount.

The case where the reliability is "3" means that the level of the degree of coincidence of the two images calculated by the AF signal processor 110 is lower than a predetermined value, but the correlation obtained by relatively shifting the A image signal and the B image signal has a certain tendency, and a defocus direction is reliable. For example, this is frequent in a state of a small blur with respect to the main object.

If neither the defocus amount nor the defocus direction is reliable, the reliability is determined to be "4". In this case, for example, the contrasts of the A image signal and the B image signal are low and the level of the degree of coincidence of the images is low. This is frequent when the object is largely blurred (out of focus), and it is difficult to calculate the defocus amount. In this embodiment and the third embodiment described below, it is assumed that the reliability "3" is set as the second reliability threshold value in the first embodiment. In other words, when the reliability is "1" or "2", it is determined that the reliability is higher than the second reliability threshold value to perform the determination of transition between the large defocus, the middle defocus, and the small defocus.

Figure 15:
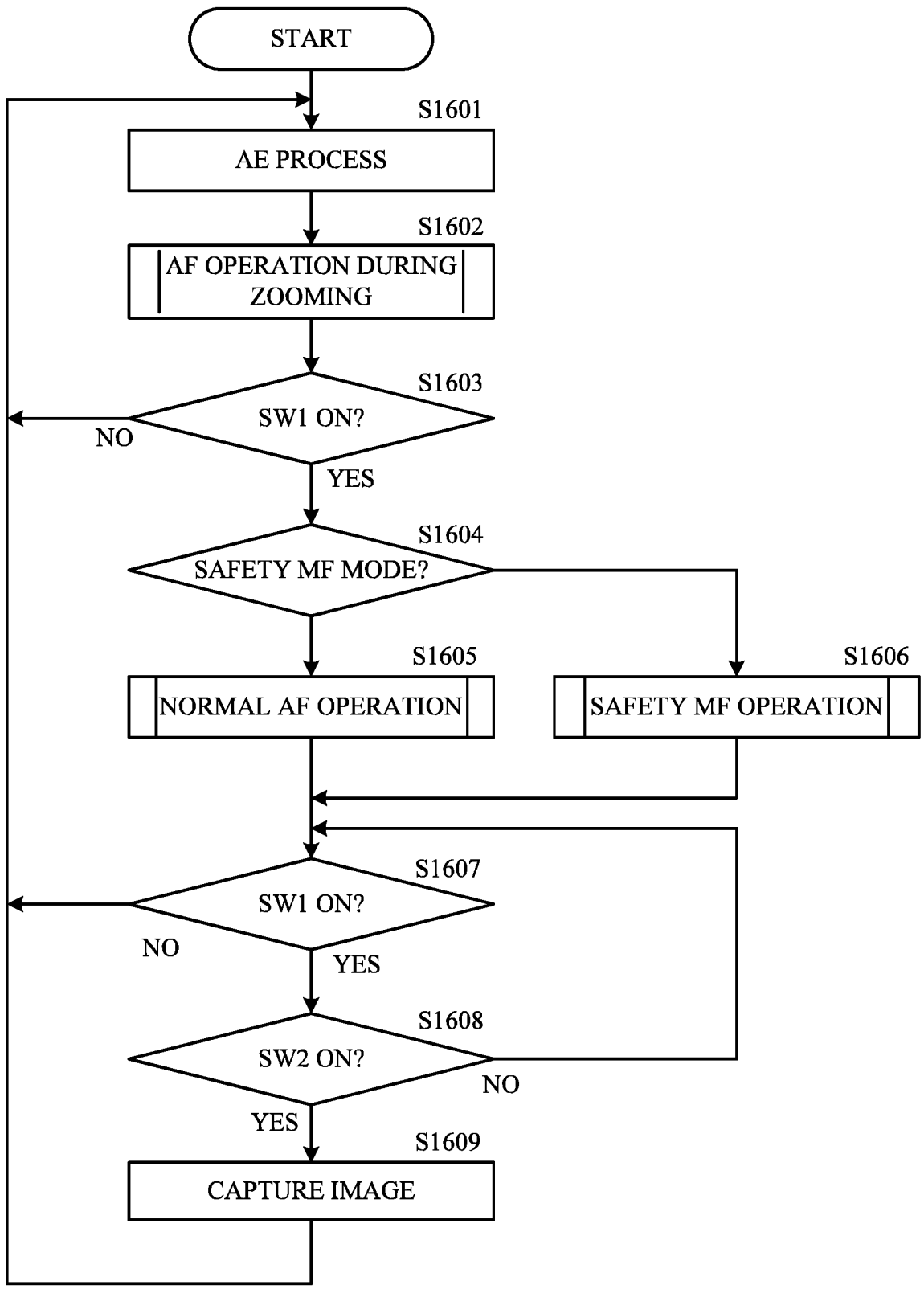
FIG. 15 is a flowchart of illustrating an operation of the image capturing apparatus in the second embodiment.

Next, referring to FIGS. 15 to 21, the operation of the image capturing apparatus 1000 will be described in detail. FIG. 15 is a flowchart illustrating the operation of the image capturing apparatus 1000. First, at step S1601, the AE processor 1119 performs the AE process. Subsequently, at step S1602, the camera controller 1114 performs an AF operation during zooming described below. Subsequently, at step S1603, the camera controller 1114 determines the state of SW1 (117). When the state of the SW1 is ON, the flow proceeds to step S1604. On the other hand, when the state of the SW1 is not ON, the flow proceeds to step S1601.

At step S1604, the camera controller 1114 determines state of the image capturing mode SW 116. When the image capturing mode is the safety MF mode (second mode), the flow proceeds to step S1606. On the other hand, when the image capturing mode is not the safety MF mode, the flow proceeds to step S1605. At step S1605, the camera controller 1114 performs a normal AF operation described below (normal mode, or first mode). At step S1606, the camera controller 1114 performs a safety MF operation described below. The normal mode (first mode) is a mode in which the focus controller (camera controller 1114) performs focus control over an entire movable range of the focus lens 1103. The safety MF mode (second mode) is a mode in which the focus control is performed within a predetermined range based on the focus lens position set by the user.

At step S1607, the camera controller 1114 determines the state of SW1 (117). When the state of the SW1 is ON, the flow proceeds to step S1608. On the other hand, when the state of the SW1 is not ON, the flow returns to step S1601. At step S1608, the camera controller 1114 determines the state of the SW2 (118). When the state of the SW2 is ON, the flow proceeds to step S1609. On the other hand, when the state of the SW2 is not ON, the flow returns to step S1607. At step S1609, the camera controller 1114 performs an image capturing operation, and then the flow returns to step S1601.

Figure 16:
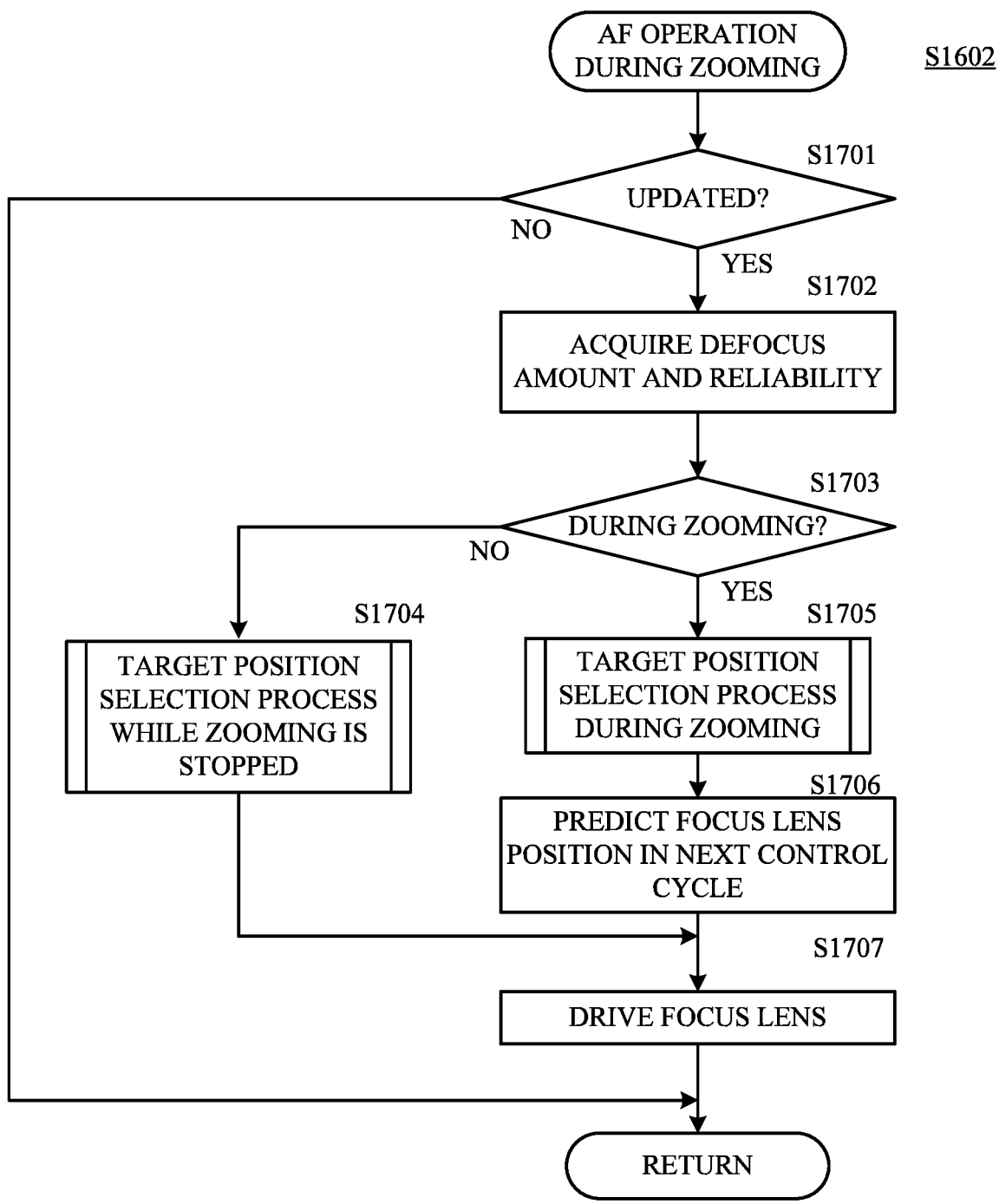
FIG. 16 is a flowchart of illustrating an AF operation during zooming in the second embodiment.

Next, referring to FIG. 16, the AF operation during zooming at step S1602 in FIG. 15 will be described. FIG. 16 is a flowchart illustrating the AF operation during zooming. This process is executed according to a computer program stored in the ROM in the camera controller 1114. For example, it is performed at a readout cycle (every vertical synchronization period) of the imaging signal from the image sensor 1107 for generating a one-field image (hereinafter, also referred to as one frame or one screen). Alternatively, it may be repeated for each of a plurality of vertical synchronization periods (V rate).

First, at step S1701, the AF signal processor 1110 confirms whether the AF signal is updated. When the AF signal is updated, the flow proceeds to step S1702, and the AF signal processor 1110 acquires the result (defocus amount and reliability). On the other hand, when the AF signal is not updated at step S1701, the flow is finished.

Subsequently, at step S1703, the camera controller 1114 determines whether the zoom lens 101 is moving. Specifically, when the user operates a zoom operation lever or the like in the camera operation unit 1115, the camera controller 1114 that detects the operation drives the zoom lens 1101. Therefore, the camera controller 1114 is aware of the movement state of the zoom lens 1101. When the zoom lens 101 is not moving at step S1703, the flow proceeds to step S1704 as a target position selection process while the zooming is stopped. On the other hand, when the zoom lens 1101 is moving at step S1703, the flow proceeds to step S1705 as a target position selection process during zooming. Steps S1704 and S1705 are both processes for selecting the target position when the focus lens 1103 is moved at the current control timing, and details will be described below.

When the zoom lens 1101 is moving, the flow proceeds to step S1706 after step S1705. At step S1706, the camera controller 1114 predicts a focus lens position at the next control timing based on a target distance selected at step S1705. Specifically, as illustrated by the cam locus at each object distance in FIG. 14, in order to maintain the in-focus state at a certain object distance, it is necessary to control the focus lens 1103 such that the cam locus of the corresponding object distance is traced according to the change of the focal length. Therefore, at step S1706, in order to maintain the state in which the target position selected at step S1705 is in focus on the target position, the camera controller 1114 determines to which position at the next control timing point the focus lens should be controlled based on the cam locus. In this embodiment, since it is assumed that the AF control process is performed every vertical synchronization period, the focus lens position advanced by the time corresponding thereto is specified from the cam locus. The cam locus information in this embodiment is stored in the ROM in the camera controller 1114 and can be obtained by interpolation from the adjacent cam locus with respect to the cam locus of the object distance not stored in the ROM. Subsequently, at step S1707, the camera controller 1114 controls the focus lens driver 1106 to move the focus lens 1103 with respect to the selected and determined target position.

<Target Position Selection Process While Zooming is Stopped>

Figure 17A:
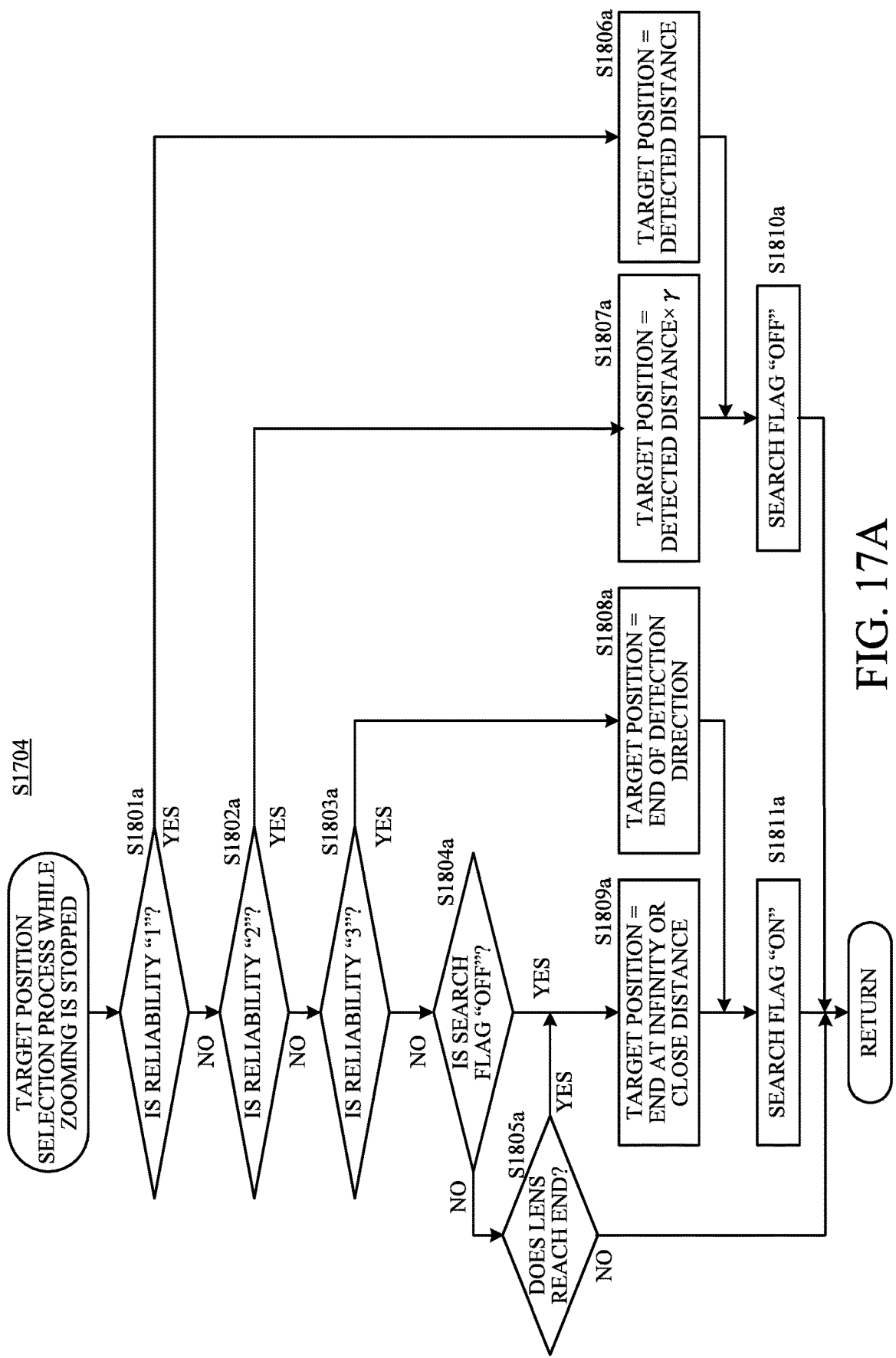
FIG. 17A is a flowchart of illustrating a target position selection process while zooming is stopped in the second embodiment.

Next, referring to FIGS. 17A and 18A, the target position selection process while the zooming is stopped at step S1704 of FIG. 16 will be described. FIG. 17A is a flowchart illustrating the target position selection process while the zooming is stopped, which is performed by the camera controller 1114. Each step of FIG. 17A is executed in accordance with a computer program stored in a ROM in the camera controller 1114 as in the AF operation during zooming.

First, at step S1801a of FIG. 17A, the camera controller 1114 determines whether the acquired reliability is "1" based on the reliability acquired at step S1702 of FIG. 16. When the reliability is "1" at step S1801a, the flow proceeds to step S1806a. On the other hand, when the reliability is not "1", the flow proceeds to step S1802a. When the reliability is "1", it is the case where the accuracy of the detected defocus amount is high and focusing can be achieved by controlling the focus lens at the target position calculated from the defocus amount. Therefore, at step S1806a, the camera controller 1114 sets, as the target position, the focus lens position (detected position) calculated based on the detected defocus amount and the current focus lens position. As described above, the manner in which the focus lens 1103 is directly driven to the detected position is referred to as a target drive (first drive) in this embodiment. Then, the search flag is turned OFF at step S1810a and the process is terminated. In this embodiment, a motion for setting a target position described below to the infinity end or the closest end of the movable range of the focus lens 1103 and specifying the in-focus position while largely moving the focus lens 1103 is called a search drive (second drive), and a flag indicating the execution state is called the search flag.

Subsequently, at step S1802a, the camera controller 1114 determines whether the acquired reliability is "2". When the reliability is "2" at step S1802a, the flow proceeds to step S1807a. On the other hand, when the reliability is not "2", the flow proceeds to step S1803a. When the reliability is "2", it means that the accuracy of the detected defocus amount includes a certain error. Therefore, at step S1807a, the camera controller 1114 sets, as the target position, a value obtained by multiplying the detected position calculated based on the detected defocus amount and the current focus lens position by the coefficient γ. The coefficient γ is a numerical value less than 1, and γ assumed in this embodiment is 0.8. Therefore, at step S1807a, a position of 80% of the detected position is set as the target position. As described above, the manner in which the focus lens 1103 is driven so as not to be insufficient to reach the detected position (in other words, so as not to overshoot) is called a defocus drive (third drive) in this embodiment. Then, at step S1810a, the search flag is turned OFF and the process is terminated.

Subsequently, at step S1803a, the camera controller 1114 determines whether the acquired reliability is "3". When the reliability is "3" at step S1803a, the flow proceeds to step S1808a. On the other hand, when the reliability is not "3", the flow proceeds to step S1804a. When the reliability is "3", although the accuracy of the detected defocus amount is low, the defocus direction is reliable. Therefore, at step S1808a, the camera controller 1114 sets the end in the detected defocus direction as the target position to perform the search drive. Then, at subsequent step S1811a, the search flag is set to ON and the process is terminated. At step S1804a, the camera controller 1114 determines whether the search flag is OFF. When the search flag is OFF at step S1804a, the flow proceeds to step S1809a. On the other hand, when the search flag is ON, the flow proceeds to step S1805a.

When the reliability is not "3" at step S1803a, the reliability is "4", and it is in the case where both the defocus amount and the defocus direction are unreliable. In this case, it is difficult to specify the in-focus position only with the information obtained from the AF signal processor 1110. Therefore, at step S1809a, the camera controller 1114 sets the end on the wider drive range as the target position based on the current focus lens position and the positional relationship between the end on the infinity side and the end on the close side of the focus lens 1103 to perform the search drive. Then, at subsequent step S1811a, the search flag is set to ON and the process is terminated.

At step S1805a, the camera controller 1114 determines whether the focus lens 1103 has reached either the infinity end or the close end. When it reaches either end at step S1805a, the flow proceeds to step S1809a to reset the target position again. As described above, since the end on the wider drive range side is set as the target position, the target position is set at the opposite end when the focus lens 1103 has reached the end. On the other hand, when it has not reached the end at step S1805a, the process is ended and the search drive continues.

As described above, in the target position selection process while the zooming is stopped in this embodiment, as illustrated in FIG. 18A, the target position based on the defocus amount is set when the reliability is high. On the other hand, when the reliability is low, the target position is set to the end of the movable range of the focus lens 103. Therefore, as the motion of the entire AF for specifying the in-focus position, the lower the reliability is, the larger the focus variation is.

<Target Position Selection Process During Zooming>

Figure 17B:
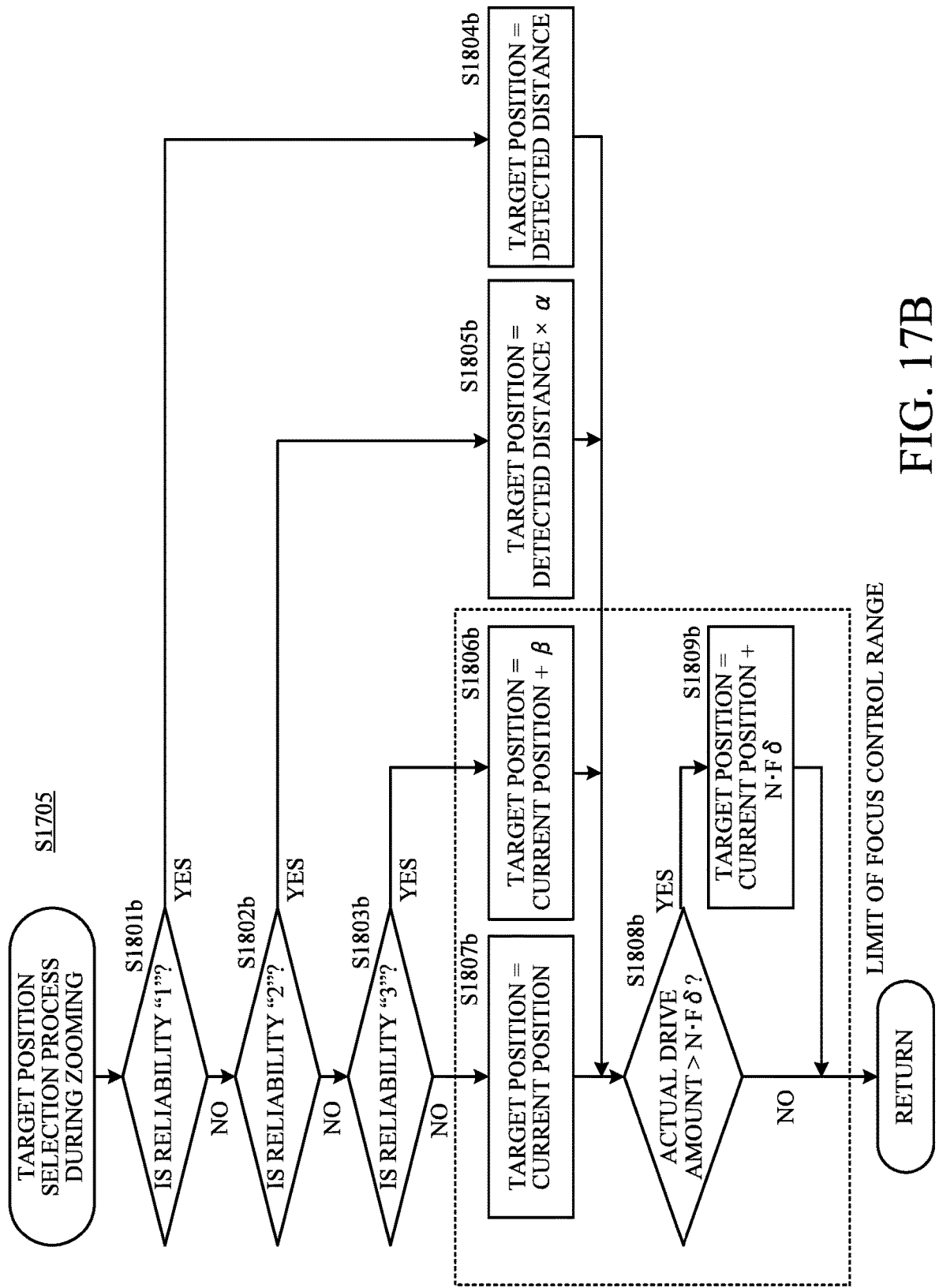
FIG. 17B is a flowchart of illustrating a target position selection process during the zooming in the second embodiment.

Next, referring to FIGS. 17B and 18B, the target position selection process during zooming at step S1705 of FIG. 16 will be described. FIG. 17B is a flowchart illustrating the target position selection process during zooming performed by the camera controller 1114. Each step of FIG. 17B is executed in accordance with a computer program stored in the ROM in the camera controller 1114 as in the AF operation during zooming.

First, at step S1801b of FIG. 17B, the camera controller 1114 determines whether the acquired reliability is "1" based on the reliability acquired at step S1702 of FIG. 16. When the reliability is "1" at step S1801b, the flow proceeds to step S1804b. On the other hand, when the reliability is not "1", the flow proceeds to step S1802b. When the reliability is "1", the accuracy of the detected defocus amount is high and focusing can be achieved by controlling the focus lens at the target position calculated from the defocus amount. Therefore, at step S1804b, the camera controller 1114 sets, as the target position, the focus lens position (detected position) calculated based on the detected defocus amount and the current focus lens position.

Subsequently, at step S1802b, the camera controller 1114 determines whether the acquired reliability is "2". When the reliability is "2" at step S1802b, the flow proceeds to step S1805b. On the other hand, when the reliability is not "2", the flow proceeds to step S1803b. When the reliability is "2", the accuracy of the detected defocus amount includes a certain error. Therefore, at step S1805b, the camera controller 1114 sets, as the target position, a value obtained by multiplying the detected position calculated based on the detected defocus amount and the current focus lens position by the coefficient α. The coefficient α is a numerical value less than 1, and α assumed in this embodiment is 0.8. Therefore, at step S1805b, a position of 80% of the detected position is set as the target position.

Subsequently, at step S1803b, the camera controller 1114 determines whether the acquired reliability is "3". When the reliability is "3" at step S1803b, the flow proceeds to step S1806b. On the other hand, when the reliability is not "3", the flow proceeds to step S1807b. When the reliability is "3", although the accuracy of the detected defocus amount is low, the defocus direction is reliable. Therefore, at step S1806b, the camera controller 1114 sets, as the target position, the position shifted from the current position by a shift amount β in the defocus direction based on the defocus direction and the current focus lens position. The shift amount β assumed in this embodiment is set to about 1·F·δ based on the depth of focus F·δ (F: F number, δ: diameter of permissible circle of confusion).

When the reliability is not "3" at step S1803b, that is, when the reliability is "4", the flow proceeds to step S1807b, and the camera controller 1114 sets the target position to the current focus lens position. After selecting the target position via step S1804b, step S1805b, step S1806b, or step S1807b, the flow proceeds to step S1808b. At step S1808b, the camera controller 1114 calculates an actual lens drive amount (actual drive amount in the drawing) based on the target position determined at step S1803b to S1807b and the current focus lens position. Then, the camera controller 1114 determines whether the actual drive amount is larger than N·F·δ. When it is determined at step S1808b that the actual drive amount is larger than N·F·δ, the flow proceeds to step S1809b. On the other hand, when it is determined that the actual drive amount is smaller than or equal to N·F·δ, the process is terminated.

At step S1809b, the camera controller 1114 changes the target position to the current position +N·F·δ so that the actual drive amount does not exceed N·F·δ. As described above, at step S1808b and S1809b, regardless of the reliability of the defocus amount, in the case where a focus change larger than a predetermined lens drive amount (N·F·δ) occurs, the camera controller 1114 corrects the target position so as to be included in a predetermined lens drive amount. With respect to the predetermined lens drive amount N·F·δ, the coefficient N in this embodiment is set to 5, and the target position is corrected to suppress the focus variation when there is a possibility that the focus variation of 5·F·δ, that is, about 5 depth or more may occur.

Figure 18C:
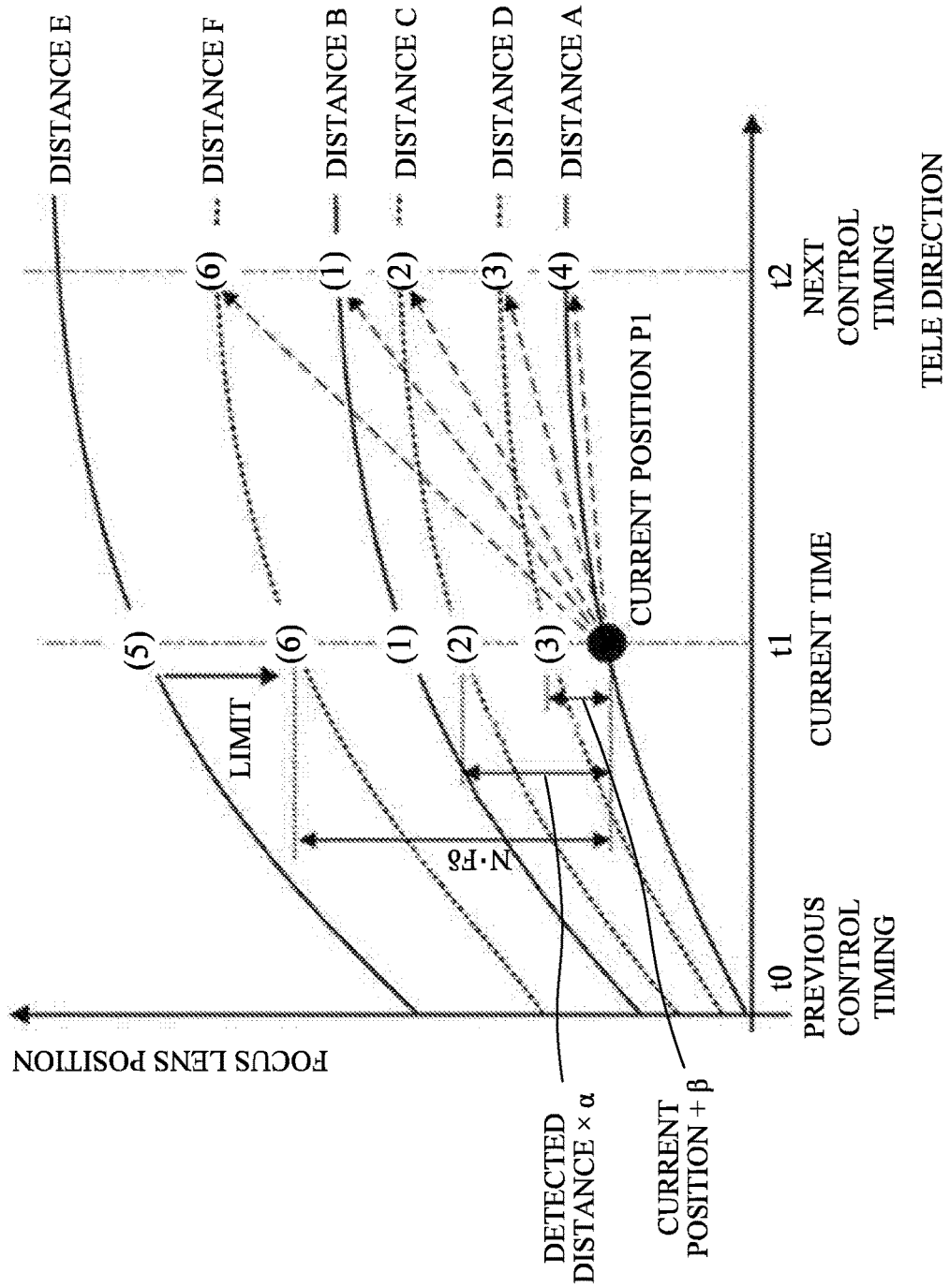

As described above, in the target position selection process during zooming in this embodiment, as illustrated in FIG. 18B, the target position based on the defocus amount is set when the reliability of the defocus amount is high. On the other hand, when the reliability is low, the target position is set based on the current lens position. FIG. 18C illustrates the positional relationship of the focus lens 1103 at the current time t1 and the next control timing t2 when the target position is selected by the target position selection process during zooming and a series of the AF control processes is performed.

Symbol P1 at time t1 indicates the current lens position and corresponds to distance A. The target position in the case of reliabilities "1" to "4" in FIG. 18B corresponds to (1) to (4) at time t1 in FIG. 18C, respectively. That is, the reliability "1" corresponds to distance B, the reliability "2" corresponds to distance C, the reliability "3" corresponds to distance D, and the reliability "4" corresponds to distance A equal to the current position. Further, as illustrated at steps S1808b and S1809b in FIG. 17B, when the target position is larger than the predetermined lens drive amount (N·F·δ), (5) at time t1 corresponds to distance E. In this case, it is corrected to distance F corresponding to (6) by the target position selection process while the zooming is stopped.

By the target position selection process while the zooming is stopped, the target positions (1) to (4) and (6) at the current time t1 are selected and determined according to the reliability of the defocus amount. Then, at step S1706 of FIG. 16, each lens position at time t2 of the next control timing is calculated based on the cam locus, and at step S1707, the focus lens is driven toward the target position at time t2.

As described above, according to this embodiment, when the target position is selected based on the defocus amount and its reliability, the target position for controlling the focus lens can be determined and controlled based on a selection rule during zooming different from the case where the zooming is not performed. That is, the focus controller (camera controller 1114) limits the drive range of the focus lens in accordance with the defocus amount and the reliability during a drive of the zoom lens. More specifically, when the focus controller determines that a movement amount of the focus lens is greater than a predetermined amount during the drive of the zoom lens, it corrects the target position of the focus lens such that the movement amount of the focus lens does not exceed the predetermined amount. This makes it possible to suppress the occurrence of a sudden focus change during zooming and to maintain the continuity of focus change. Further, in the zoom AF operation, even when the reliability becomes low despite being in the vicinity of the in-focus state in the case of the low contrast object or the low illuminance, the focus tracking performance during the zoom operation is prioritized without adding the plurality of frames.

Figure 19A:
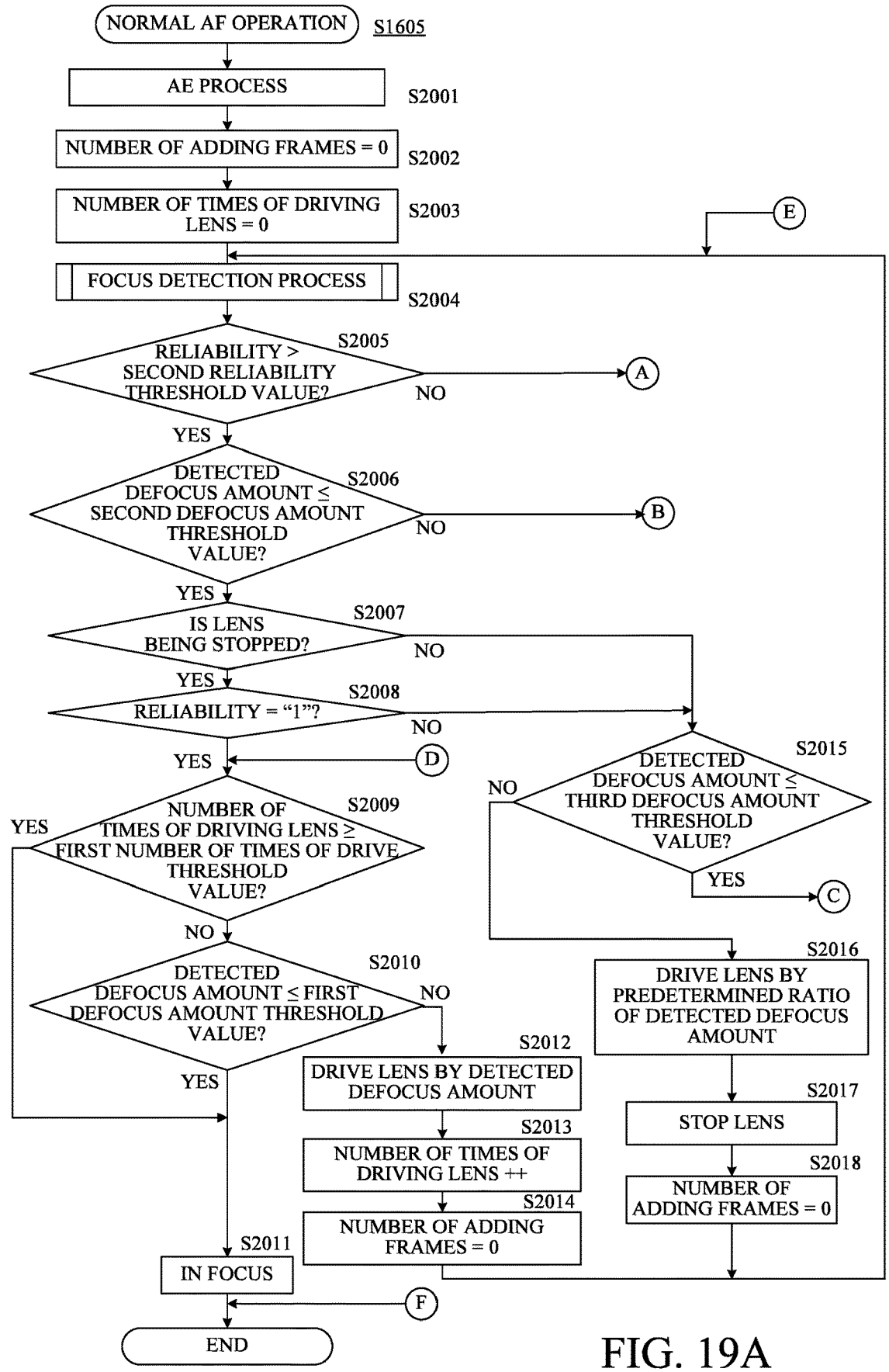
FIG. 19A is a flowchart of illustrating a normal AF operation in the second embodiment.
Figure 19B:
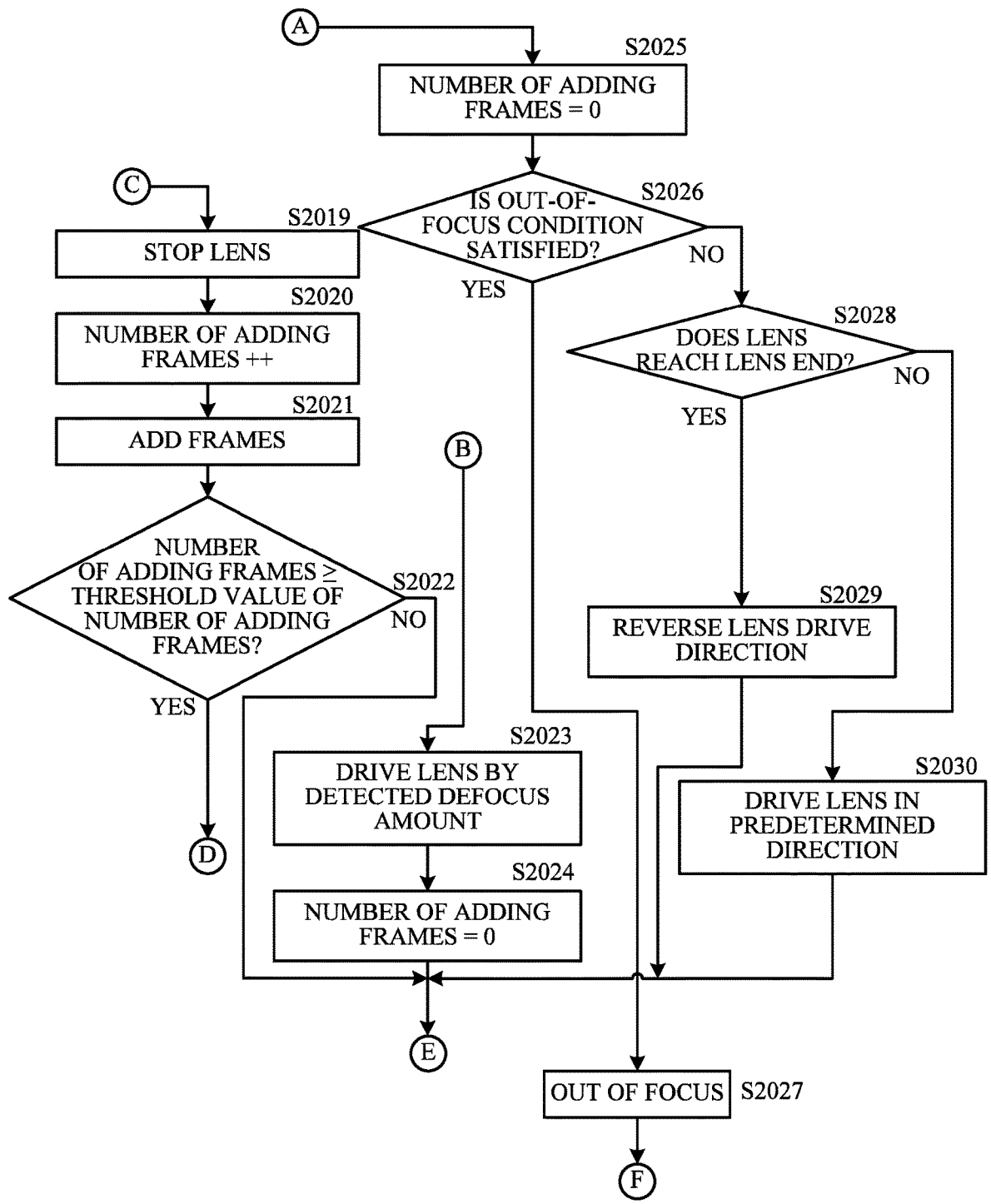
FIG. 19B is a flowchart of illustrating the normal AF operation in the second embodiment.

Next, referring to FIGS. 19A and 19B, the normal AF operation at step S1605 in FIG. 15 will be described. FIGS. 19A and 19B are flowcharts illustrating the normal AF operation.

First, at step S2001 of FIG. 19A, the AE processor 1119 performs the AE process. Subsequently, at step S2002, the camera controller 1114 initializes the frame addition number to zero. The frame addition number is to determine how many frames of the focus detection result detected up to this time has been added. Subsequently, at step S2003, the camera controller 1114 initializes the lens drive frequency to zero. The lens drive frequency is for determining how many times the lens drive has been performed at step S2012 described below. Subsequently, at step S2004, the camera controller 1114 performs a focus detection process to detect the defocus amount and the reliability. The focus detection process will be described below.

Subsequently, at step S2005, the camera controller 1114 determines whether the reliability of the result detected at step S2004 is higher than the second reliability threshold value (that is, whether or not the reliability is one of "1" and "2"). When the reliability is higher than the second reliability threshold value, the flow proceeds to step S2006. On the other hand, when the reliability is lower than or equal to the second reliability threshold value (that is, the reliability is neither "1" nor "2"), the flow proceeds to step S2025. At step S2006, the camera controller 1114 determines whether the defocus amount detected at step S2004 is less than or equal to a preset second defocus amount threshold value. When the detected defocus amount is less than or equal to the second defocus amount threshold value, the flow proceeds to step S2007. On the other hand, when the defocus amount is larger than the second defocus amount threshold value, the flow proceeds to step S2023 in FIG. 19B. If the defocus amount is less than or equal to the second defocus amount threshold value, the second defocus amount threshold value is set to a value (for example, five times the depth of focus) where the focus lens can be controlled in the depth of focus within the predetermined number of times (for example, three) by the defocus amount after that.

At step S2007 of FIG. 19A, the camera controller 1114 determines whether the focus lens 1103 is stopped. When the focus lens 1103 is stopped, the flow proceeds to step S2008. On the other hand, when the focus lens 1103 is not stopped, the flow proceeds to step S2015. At step S2008, the camera controller 1114 determines whether the reliability of the result detected at step S2004 is "1". When the reliability is "1", the flow proceeds to step S2009. On the other hand, when the reliability is not "1", the flow proceeds to step S2015.

At step S2009, the camera controller 1114 determines whether the number of times of driving the lens is greater than or equal to the first number of times of drive threshold value. When the number of times of driving the lens is greater than or equal to the first number of times of drive threshold value, the flow proceeds to step S2011. On the other hand, when the number of times of driving the lens is less than the first number of times of drive threshold value, the flow proceeds to step S2010. The first number of times of drive threshold value is set to the number of times where the lens can be driven to the vicinity of the in-focus position (for example, within the depth of focus) when it is less than or equal to the second defocus threshold value. For example, in the normal AF operation, the first number of times of drive threshold value is set to three.

At step S2010, the camera controller 1114 determines whether the defocus amount detected at step S2004 is less than or equal to a preset first defocus amount threshold value. When the defocus amount is less than or equal to the first defocus amount threshold value, the flow proceeds to step S2011. On the other hand, when the defocus amount is larger than the first defocus amount threshold value, the flow proceeds to step S2012. If the detected defocus amount is less than or equal to the first defocus amount threshold value, the first defocus amount threshold value is set so as to be a value where the focus lens is controlled within the depth of focus.

At step S2011, the camera controller 1114 determines that the focal state is the in-focus state, and then the flow is finished. At step S2012, the camera controller 1114 drives the focus lens 1103 by the defocus amount detected at step S2004, and then the flow proceeds to step S2013. At step S2013, the camera controller 1114 increments the number of times of driving the lens. Subsequently, at step S2014, the camera controller 1114 initializes the frame addition number to zero, and then the flow returns to step S2004.

At step S2015, the camera controller 1114 determines whether the detected defocus amount is less than or equal to a third defocus amount threshold value. When the detected defocus amount is less than or equal to the third defocus amount threshold value, the flow proceeds to step S2016. On the other hand, when the detected defocus amount is larger than the third defocus amount threshold value, the flow proceeds to step S2019. At step S2016, the camera controller 1114 drives the focus lens 103 by a predetermined ratio with respect to the defocus amount detected at step S2004. Subsequently, at step S2017, the camera controller 1114 outputs an instruction to stop the focus lens 1103. Subsequently, at step S2018, the camera controller 1114 initializes the frame addition number to zero, and then the flow returns to step S2004.

At step S2019 of FIG. 19B, the camera controller 1114 outputs an instruction to stop the focus lens 1103. Subsequently, at step S2020, the camera controller 1114 increments the frame addition number. Subsequently, at step S2021, the camera controller 1114 adds the defocus amounts for the plurality of frames detected up to this time. The frame as a target for the frame addition is determined so as to be the frame addition number incremented at step S2020 including this time.

Subsequently, at step S2022, the camera controller 1114 determines whether the frame addition number (number of adding the frames) is greater than or equal to the frame addition number threshold value (threshold value of the number of adding the frames). When the frame addition number is greater than or equal to the frame addition number threshold value, the flow proceeds to step S2009. On the other hand, when the frame addition number is less than the frame addition number threshold value, the flow returns to step S2004. The frame addition number threshold value is set by the number of the frames where a sufficient AF accuracy can be obtained by performing addition and averaging, and for example it is set to four. Further, the added defocus amount is averaged by using the frame addition number, and at step S210 immediately after averaging the added defocus amount, the determination is performed based on the added and averaged defocus amount.

Subsequently, at step S2023, the camera controller 1114 drives the focus lens 1103 by a predetermined ratio with respect to the defocus amount detected at step S2004. The predetermined ratio is set such that the lens drive amount is smaller than the defocus amount (for example, 80%). Further, the lens speed is set to be slower than the lens drive speed which can be driven by the lens drive amount set, for example, in one frame time. As a result, when the detected defocus amount is incorrect, it is possible to prevent the lens from exceeding the focus position for the object and further drive the lens without stopping the lens, thereby enabling the next lens drive (overlap control). Subsequently, at step S2024, the camera controller 1114 initializes the frame addition number to zero, and the flow returns to step S2004.

At step S2025, the camera controller 1114 initializes the frame addition number to zero. Subsequently, at step S2026, the camera controller 1114 determines whether the out-of-focus condition is satisfied. When the out-of-focus condition is satisfied, the flow proceeds to step S2027. On the other hand, when the out-of-focus condition is not satisfied, the flow proceeds to step S2028. The out-of-focus condition is a condition for determining that there is no object to be focused. As the out-of-focus condition, for example, a condition in which the lens drive is completed in the entire movable range of the focus lens 1103, that is, a condition in which the focus lens 1103 detects both lens ends on the far side and near side and then returns to the initial position, is set.

At step S2027, the camera controller 1114 determines that the focal state is the out-of-focus state, and the flow is finished. At step S2028, the camera controller 1114 determines whether the focus lens 1103 has reached the lens end on the far side or near side. When the focus lens 1103 reaches the end of the lens, the flow proceeds to step S2029. On the other hand, when the focus lens 1103 does not reach the lens end, the flow proceeds to step S2030. At step S2029, the camera controller 1114 inverts the drive direction of the focus lens 1103 and then the flow returns to step S2004. At step S2030, the camera controller 1114 drives the focus lens 1103 in a predetermined direction, and then the flow returns to step S2004. As the focus lens speed, for example, the fastest speed is set within a range of the lens speed such that the focus lens does not pass through the in-focus position at the time when the defocus amount can be detected.

As described above, in the normal AF operation, unlike the zoom AF operation, in the case where the reliability becomes low despite being in the vicinity of the in-focus state in the low contrast object or the low illuminance, the focusing performance is prioritized over the AF time to add the plurality of frames. Furthermore, the manner of the AF control depending on the reliability is different from the zoom AF operation.

Figure 20:
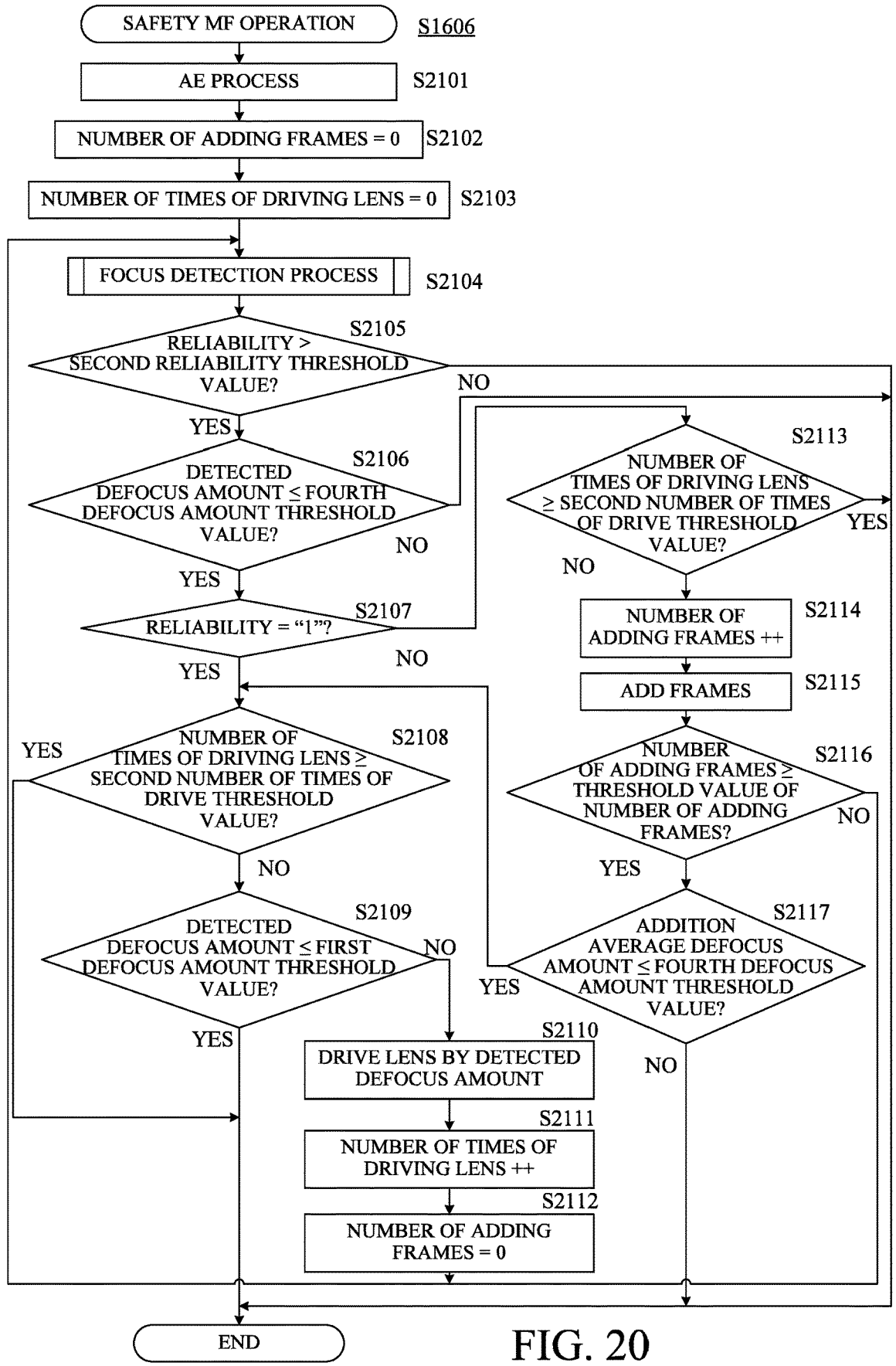
FIG. 20 is a flowchart of illustrating a safety MF operation in the second embodiment.

Next, referring to FIG. 20, the safety MF operation at step S1606 of FIG. 15 will be described. FIG. 20 is a flowchart illustrating the safety MF operation. Steps S2101 to S2105 are respectively similar to steps S2001 to S2005 for the normal AF operation, and thus descriptions thereof will be omitted. When the reliability is higher than the second reliability threshold value, the flow proceeds to step S2106. On the other hand, when the reliability is lower than or equal to the second reliability threshold value, the flow is finished. In the normal AF operation, the lens drive is performed in a predetermined direction when the reliability is lower than or equal to the second reliability threshold value, but in the safety MF operation, the safety MF operation is finished without driving the focus lens since it is necessary to capturing an image in the vicinity of the current focus lens position.

At step S2106, the camera controller 1114 determines whether the defocus amount detected at step S2104 is less than or equal to a preset fourth defocus amount threshold value (defocus amount threshold value). When the defocus amount is less than or equal to the fourth defocus amount threshold value, the flow proceeds to step S2107. On the other hand, when the defocus amount is larger than the fourth defocus amount threshold value, the flow is terminated. Unlike the second defocus amount threshold value in the normal AF operation, the fourth defocus amount threshold value is set as a threshold value such that the focus variation is not easily recognized on the display 1111 even when the focus lens drive is performed based on the fourth defocus amount threshold value. As the fourth defocus amount threshold value, for example, an amount three times the depth of focus is set.

At step S2107, the camera controller 1114 determines whether the reliability of the result detected at step S2104 is "1". When the reliability is "1", the flow proceeds to step S2108. On the other hand, when the reliability is not "1", the flow proceeds to step S2113. At step S2108, the camera controller 1114 determines whether the number of times of driving the lens is greater than or equal to the second number of times of drive threshold value. When the number of times of driving the lens is greater than or equal to the second number of times of drive threshold value, the flow is terminated. On the other hand, when the number of driving the lens is less than the second number of times of drive threshold value, the flow proceeds to step S2109. The second number of times of drive threshold value is set to be less than the first number of times of drive threshold value in the normal AF operation, and for example, it is set to one (one time). As a result, the number of times of driving the lens can be reduced in the safety MF operation, and the AF time can be shortened. Further, in the safety MF operation, the focus lens is moved in the vicinity of the in-focus position in advance by the user, so that the lens can be driven to the in-focus position even if the number of times of driving the lens is small. Steps S2109 to S2112 are respectively the same as steps S2010, S2012 to S2014 for the normal AF operation, and therefore detailed description is omitted, but the flow is finished when the detected defocus amount is less than or equal to the first defocus amount threshold value. On the other hand, when the defocus amount is larger than the first defocus amount threshold value, the focus lens 103 is driven based on the detected defocus amount, the number of times of driving the lens is incremented, the frame addition number is initialized to zero, and then the flow returns to step S2104.

At step S2113, the camera controller 1114 determines whether the number of times of driving the lens is greater than or equal to the second number of times of drive threshold value. When the number of times of driving the lens is greater than or equal to the second number of times of drive threshold value, the flow is terminated. On the other hand, when the number of times of driving the lens is smaller than the second number of times of drive threshold value, the flow proceeds to step S2114. As a result, even when the condition for performing the frame addition is satisfied, the number of times of adding the frames and the number of times of driving the lens can be limited to be small, and accordingly the AF time can be reduced.

At step S2114, the camera controller 1114 increments the number of adding the frames (frame addition number). Subsequently, at step S2115, the camera controller 1114 adds the defocus amounts for the plurality of frames detected up to this time. The frame as a target of the frame addition is determined so as to be the frame addition number incremented at step S2114 including this time. Subsequently, at step S2116, the camera controller 1114 determines whether the frame addition number is greater than or equal to the frame addition number threshold value (threshold value of the number of adding the frames). When the frame addition number is greater than or equal to the frame addition number threshold value, the flow proceeds to step S2117. On the other hand, when the frame addition number is smaller than the frame addition number threshold value, the flow returns to step S2104. As in the case of the normal AF operation, the frame addition number threshold value is set by the number of the frames where a sufficient AF accuracy can be obtained by performing addition and averaging, and for example it is set to four.

At step S2117, the camera controller 1114 determines whether the added and averaged defocus amount obtained by averaging the defocus amounts added at step S2115 by the frame addition number is less than or equal to the fourth defocus amount threshold value. When the added and averaged defocus amount is less than or equal to the fourth defocus amount threshold value, the flow proceeds to step S2108. On the other hand, when the added and averaged defocus amount is larger than the fourth defocus amount threshold value, the flow is terminated. At step S2109 immediately after the determination at step S2117, the camera controller 1114 performs a determination based on the added and averaged defocus amount. As a result, it is possible to perform the AF control in a range where the focus variation is not easily recognized on the display 1111 even when the focus lens drive is performed.

As described above, in the safety MF operation, unlike the zoom AF operation, in the case where the reliability becomes low despite being in the vicinity of the in-focus state in the low contrast object and low illuminance, priority is given to the focusing performance over the AF time to add the plurality of frames. Further, since it is an MF mode and it is necessary to reduce the AF time, the number of times of driving the lens is different from that in the normal AF operation (i.e., the number of times is smaller than that of the normal AF operation). In addition, the way of the AF control according to the reliability is different from the zoom AF operation and the normal AF operation.

Figure 21:
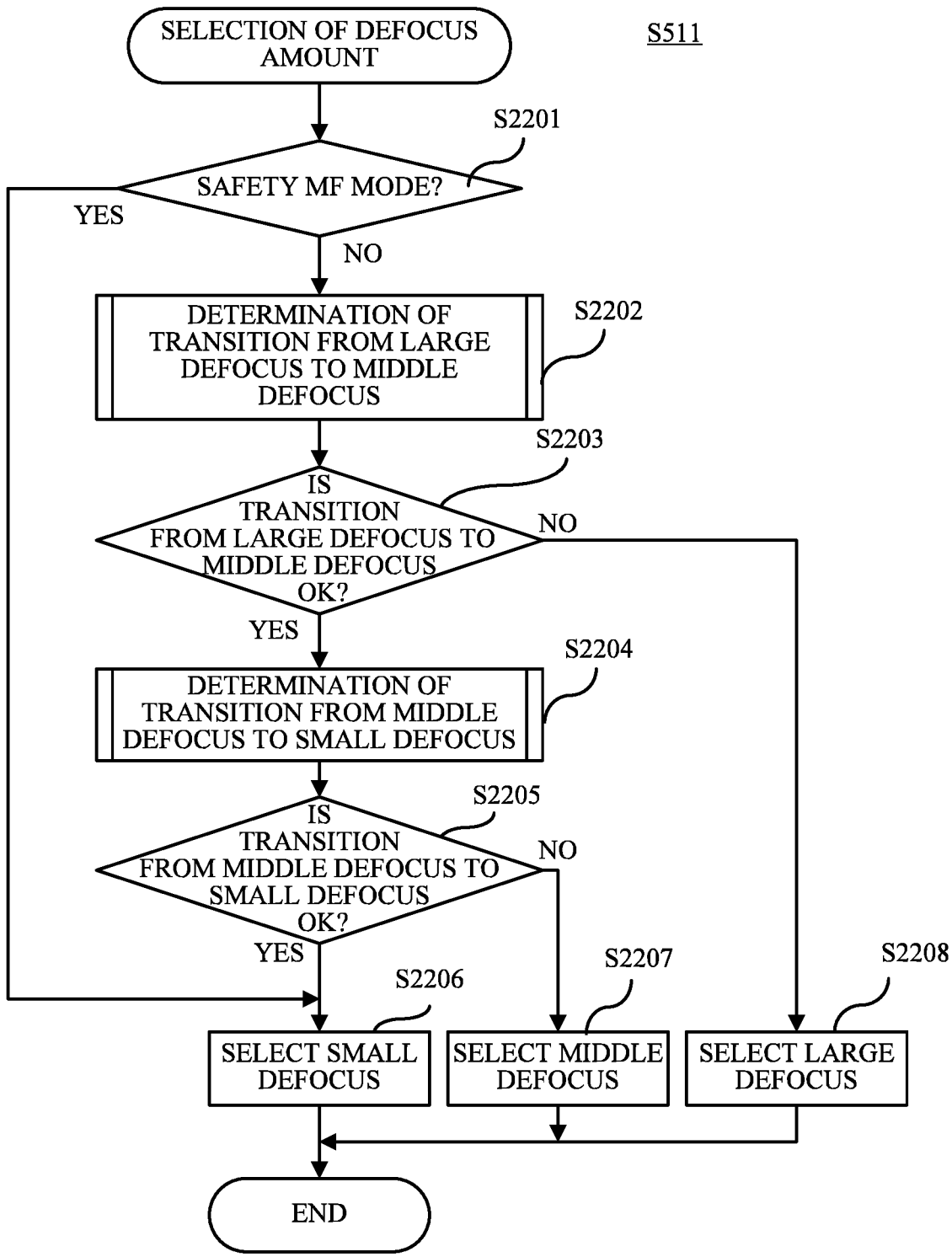
FIG. 21 is a flowchart of illustrating a selection of a defocus amount in the second embodiment.

Next, referring to FIG. 21, the selection of the defocus amount at step S511 of FIG. 5 will be described. First, at step S2201, the camera controller 1114 determines a state (image capturing mode) of the image capturing mode SW 1116. When the image capturing mode is the safety MF mode, the flow proceeds to step S2206, and the small defocus is selected. In this way, when the image capturing mode is the safety MF mode, the small defocus is always selected on the premise that the focus lens is set in the vicinity of the in-focus position in advance by the user. On the other hand, when the image capturing mode is not the safety MF mode, the flow proceeds to step S2202. Steps S2202 to S2208 in FIG. 21 are the same as steps S1001 to S1007 in FIG. 10, respectively, and descriptions thereof will be omitted.

Third Embodiment

Next, a third embodiment of the present invention will be described. In this embodiment, an example in which the present invention is applied to an image capturing apparatus where a lens barrel and an image capturing apparatus body can be separated is described.

<Overall Structure>

Figure 22:
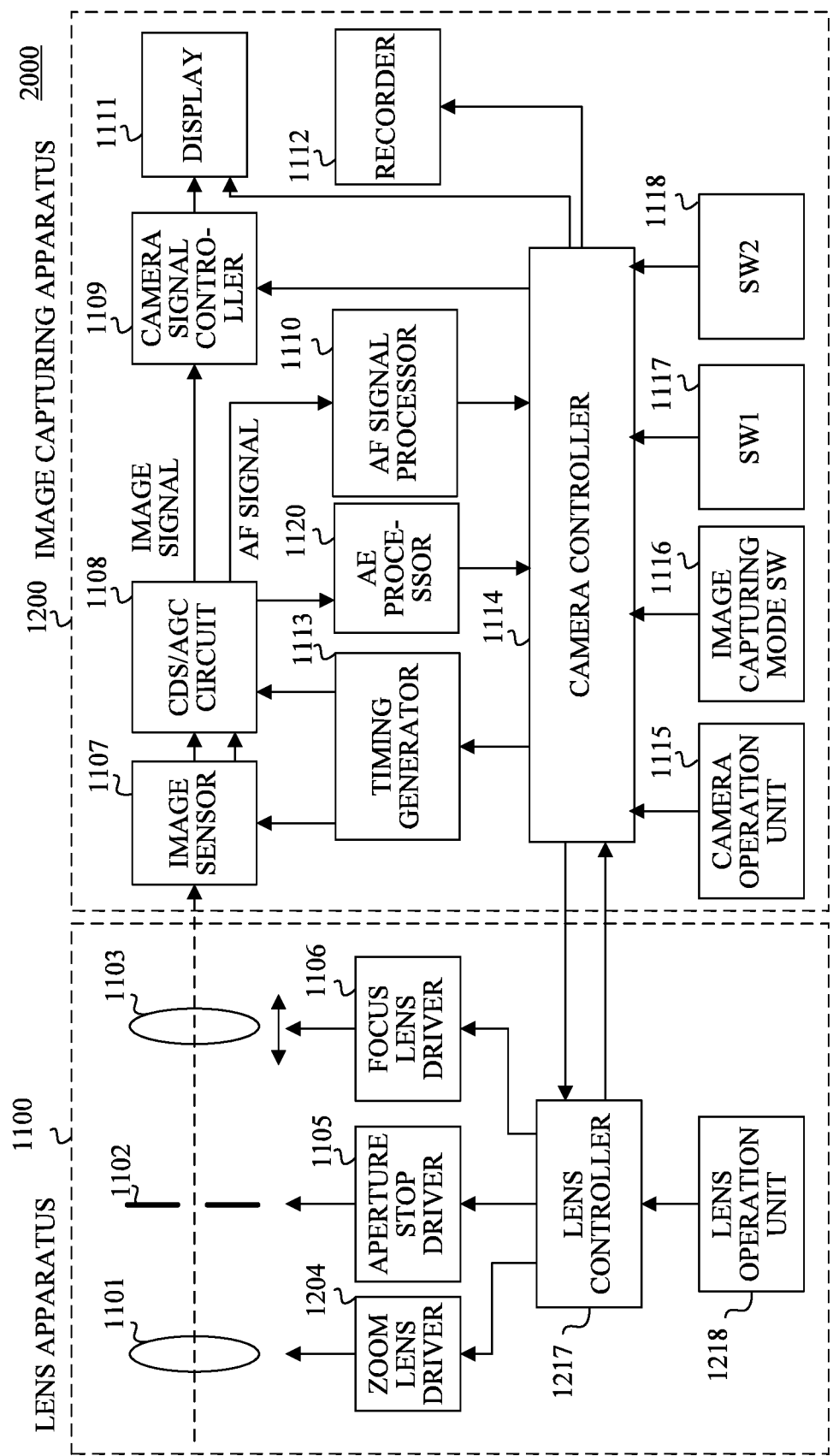
FIG. 22 is a block diagram of an image capturing apparatus in a third embodiment.

First, referring to FIG. 22, an example of an image capturing apparatus in this embodiment will be described. FIG. 22 is a block diagram of an image capturing apparatus 2000 in this embodiment. As illustrated in FIG. 22, the image capturing apparatus 2000 includes a lens apparatus 1100 and an image capturing apparatus body 1200. In the image capturing apparatus 2000, a lens controller 1217 that controls the operation of the entire lens apparatus 1100 and a camera controller 1114 that controls the operation of the entire image capturing apparatus body 1200 communicate information.

First, the configuration of the lens apparatus 1100 will be described. The lens apparatus 1100 includes a zoom lens 1101, an aperture stop 1102, a focus lens 1103, a zoom lens position detector 1204, an aperture stop driver 1105, a focus lens driver 1106, a lens controller 1217, and a lens operation unit 1218. The zoom lens 1101 is manually operated by a zoom ring member (not illustrated) to change the focal length. At that time, the position of the zoom lens 1101 is detected by the zoom lens position detector 1204 to be used for controlling the lens apparatus 1100 and the image capturing apparatus body 1200. The aperture stop 1102 is driven by the aperture stop driver 1105 and it controls an amount of light incident on the image sensor 1107 described below.

The focus lens 1103 is driven by the focus lens driver 1106, and it performs focusing to be imaged on the image sensor 1107 described below. The aperture stop driver 1105 and the focus lens driver 1106 are controlled by the lens controller 1217, and they determine the opening of the aperture stop 1102 and the position of the focus lens 1103. When the user operates the lens operation unit 1218, the lens controller 1217 performs control according to the operation by the user. The lens controller 1217 controls the aperture stop driver 1105 and the focus lens driver 1106 according to a control command and control information received from the camera controller 1114 described below and it transmits lens control information to the camera controller 1114.

The lens controller 1217 of the lens apparatus 1100 in this embodiment stores the cam locus information illustrated in FIG. 14 in a ROM (not illustrated) provided therein. When the zoom lens position detector 1204 detects a change of the position of the zoom lens 1101, the lens controller 1217 controls the focus lens 1103 so as to maintain the in-focus state by a cam locus tracking process described below.

Next, the configuration of the image capturing apparatus body 1200 will be described. The basic configuration of the image capturing apparatus body 1200 is common to the configuration of the image capturing apparatus 1000 described in the second embodiment referring to FIG. 13. However, in this embodiment, the process content of the camera controller 1114 is different from that in the second embodiment.

The camera controller 1114 performs control by communicating information with the entire image capturing apparatus 1200. In addition to the processes in the image capturing apparatus 1200, in response to an input from the camera operation unit 1115, it performs operations of various camera functions operated by a user, such as turning on/off the power supply, changing the setting, starting the recording, starting the AF control, and confirming the recorded image. In addition, as described above, the camera controller 1114 communicates the information with the lens controller 1217 in the lens apparatus 1100, sends lens control instructions and control information, and acquires information in the lens, which is different from the second embodiment.

<Cam Locus Tracking Process>

Figure 23:
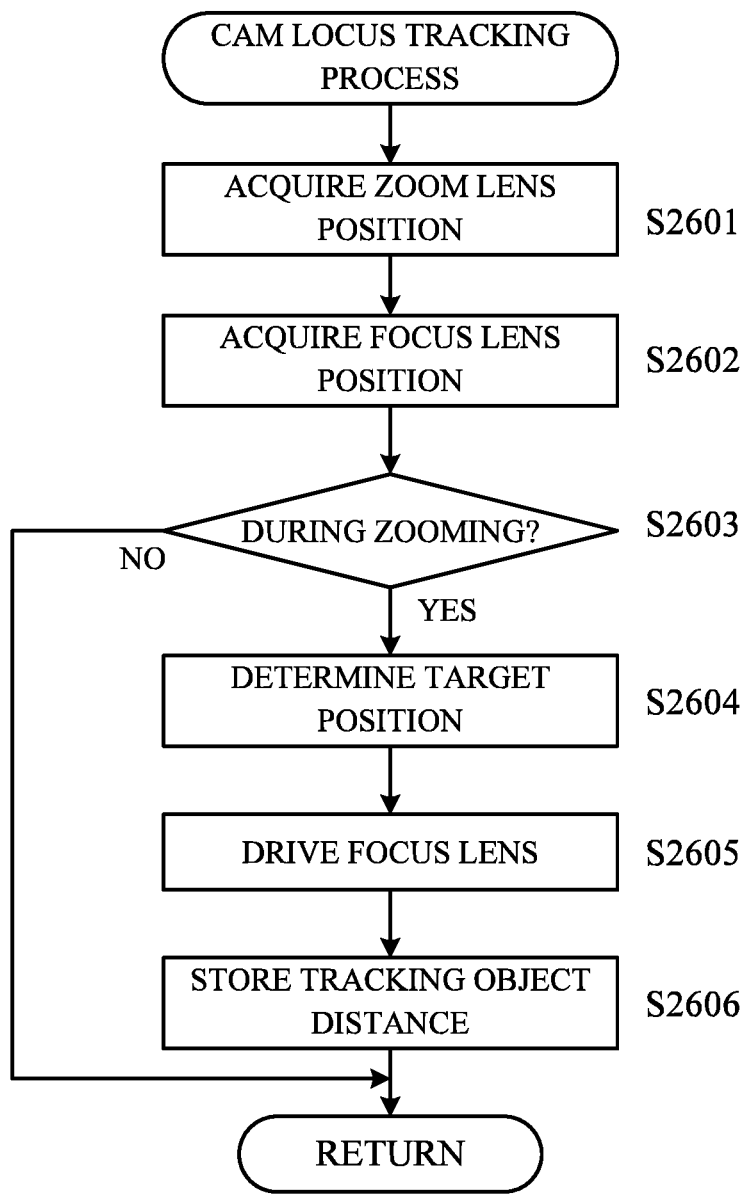
FIG. 23 is a flowchart of illustrating a cam locus tracking process in the third embodiment.

Next, referring to FIG. 23, a cam locus tracking process performed by the lens controller 1217 will be described. FIG. 23 is a flowchart illustrating the cam locus tracking process performed by the lens controller 1217. This process is executed in accordance with a computer program stored in the ROM in the lens controller 1217. This process is periodically performed by the lens controller 1217 in a cycle of 10 msec in this embodiment.

First, at step S2601 of FIG. 23, the lens controller 1217 acquires the current position information of the zoom lens 1101 from the zoom lens position detector 1204. Subsequently, at step S2602, the lens controller 1217 acquires the current position information of the focus lens 1003 from the focus lens driver 1106. Subsequently, at step S2603, the lens controller 1217 compares the previously acquired zoom lens position with the zoom lens position acquired at the previous control timing, and based on the change, determines whether zooming is in progress or not. When the zooming is in progress at step S2603, the flow proceeds to step S2604. On the other hand, when the zooming is not being performed (when the zooming is stopped), the flow is finished.

At step S2604, the lens controller 1217 determines the target position of the focus lens 1103 at the current control timing. Specifically, based on the zoom lens position acquired at step S2601 and the object distance (tracking object distance) that is a target when tracking the cam locus, the lens controller 1217 specifies the focus lens position that corresponds to the tracking object distance at the current focal length. The tracking object distance during tracking the cam locus is updated when the lens controller 1217 controls the focus lens 1103 via the focus lens driver 1106. Therefore, the updating is performed in both the case where the focus lens 1103 is controlled inside the lens apparatus 1100 by the lens controller 1217 as in the cam locus tracking process and the case where the focus lens 1103 is controlled by an instruction from the camera controller 1114.

At step S2605, the lens controller 1217 drives the focus lens 1103 by a difference between the focus lens position acquired at step S2602 and the target position determined at step S2604. Subsequently, at step S2606, the lens controller 1217 stores, as the tracking object distance, the object distance corresponding to the position after driving the focus lens 1103 in the recorder 1112, and then the flow is finished.

Figure 26C:
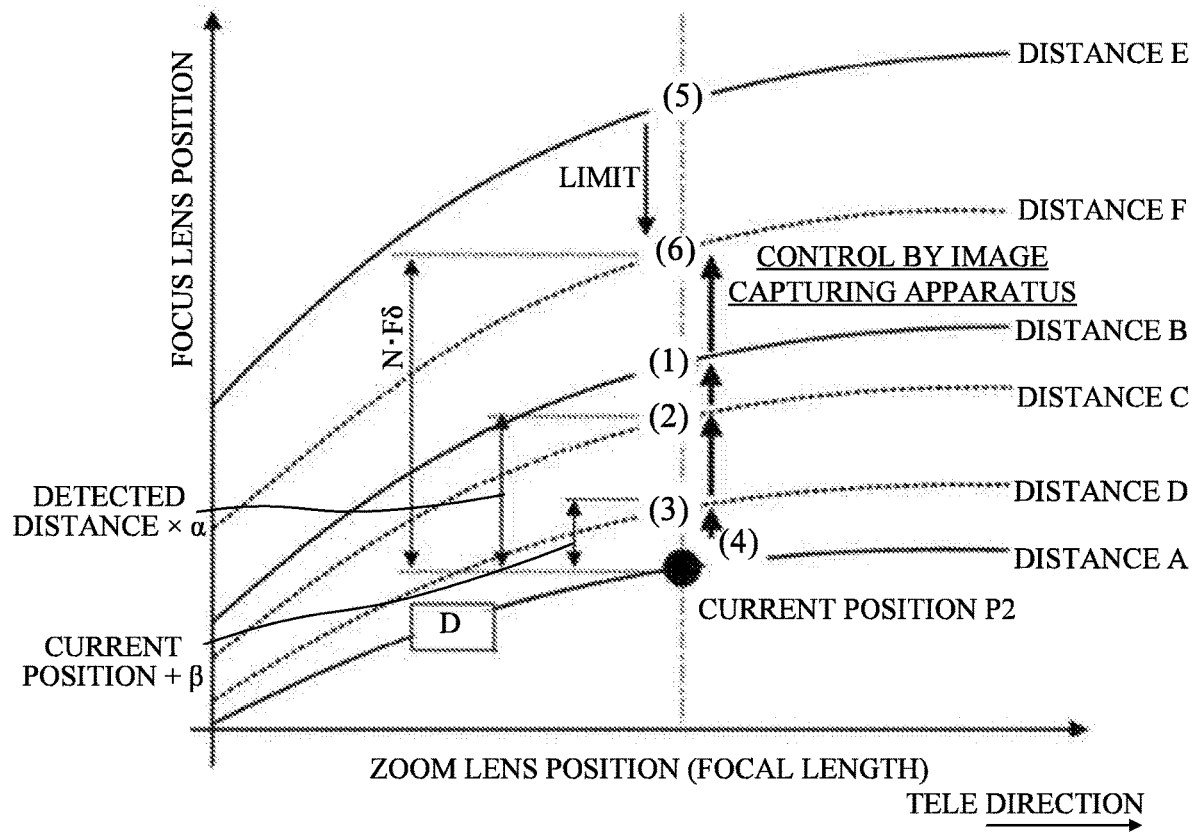
Figure 26D:
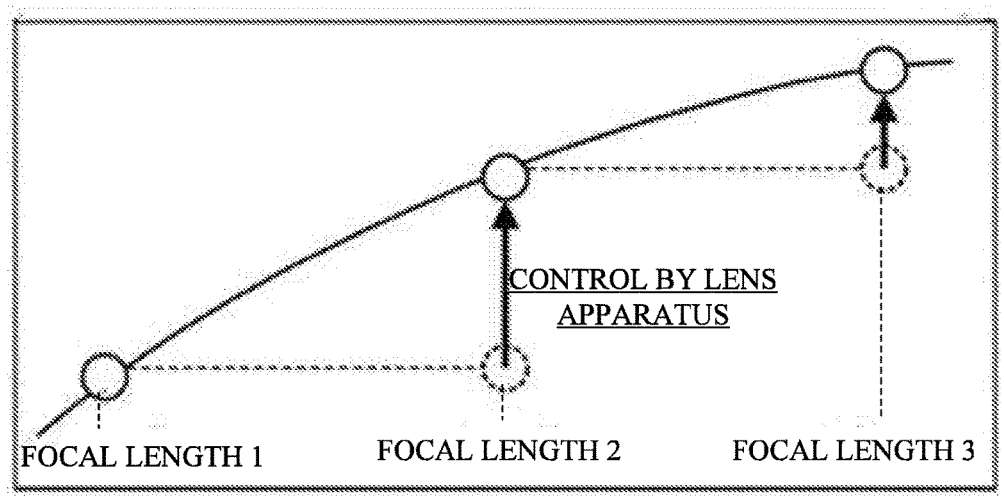

Next, referring to FIGS. 26C and 26D, the movement of the focus lens 1103 when a series of the cam locus tracking processes is performed will be described. FIG. 26C is a diagram illustrating the tracking movement of the focus lens 1103 based on the cam locus information during the change of the focal length, and symbol P2 represents the current position of the focus lens 1103 at a certain control timing. In FIG. 26C, the cam locus tracking process is performed on the focus lens 1103 with the tracking object distance as distance A. FIG. 26D is an enlarged view of a part (area D) of FIG. 26C. When the movement of the focus lens 1103 is captured in a shorter time, the focus lens 1103 is periodically controlled to track the cam locus of distance A by the cam locus tracking process. By repeating the tracking control to this cam locus, it is possible to maintain the object distance even when the focal length changes.

<AF Operation During Zooming>

Figure 24:
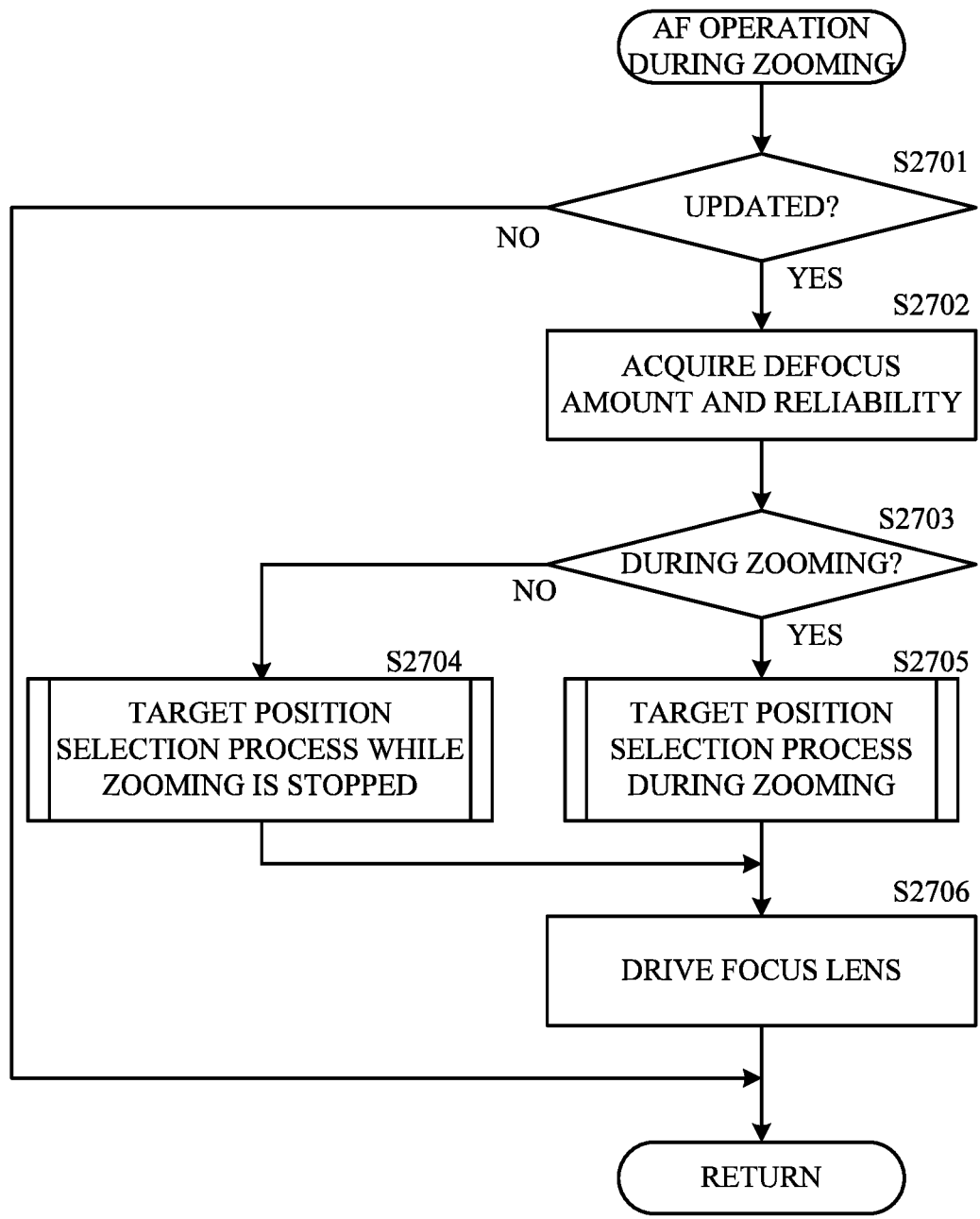
FIG. 24 is a flowchart of illustrating an AF operation during zooming in the third embodiment.

Next, referring to FIG. 24, an AF operation during zooming performed by the camera controller 1114 will be described. FIG. 24 is a flowchart illustrating the AF operation during zooming performed by the camera controller 1114. This process is executed according to a computer program stored in the ROM in the camera controller 1114. For example, it is performed at a readout cycle (every vertical synchronization period) of the imaging signal from the image sensor 1107 for generating a one-field image (hereinafter, also referred to as one frame or one screen). Alternatively, it may be repeated for each of a plurality of vertical synchronization periods (V rate).

At step S2701 to S2705 in FIG. 24, the process up to the target position selection process of the focus lens is performed. Steps S2701 to S2705 are respectively the same as steps S1701 to S1705 of FIG. 16 of the second embodiment, and accordingly descriptions thereof are omitted. After step S2704 or step S2705 is completed, the flow proceeds to step S2707 to drive the focus lens, and then the flow is finished. This flow is different from the flow of the operation during zooming (the flow of FIG. 16) of the second embodiment in that step S1706 does not exist.

<Target Position Selection Process While Zooming is Stopped>

Since the target position selection process while zooming is stopped in this embodiment is similar to that of the second embodiment, the description thereof will be omitted. FIG. 26A illustrates the target position set in the target position selection process while the zooming is stopped in this embodiment, which is the same as in FIG. 18A.

<Target Position Selection Process During Zooming>

Next, referring to FIG. 25 and FIGS. 26B, 26C, and FIG. 26D, a target position selection process during zooming at step S2705 of FIG. 24 will be described. FIG. 25 is a flowchart illustrating an AF process during zooming performed by the camera controller 1114. Each step of FIG. 25 is executed in accordance with the computer program stored in the ROM in the camera controller 1114 as in the AF control process.

The target position selection process during zooming in this embodiment is different from the target position selection process during zooming in the second embodiment in that the flow is finished without setting the target position when the reliability is not "3" at step S2803b. Steps S2801b to S2806b of the flowchart are respectively the same as steps S1801b to S1806b of FIG. 17B, and thus descriptions thereof will be omitted.

Step S2808b is the same as steps S1808b and S2808b in FIG. 17, and the actual drive amount is set to N·F·δ if the actual lens drive amount (actual drive amount in the drawing) is greater than N·F·δ. At step S2808b, the camera controller 1114 sets the coefficient N in this embodiment to 5, and the target position is corrected to suppress the focus variation when there is a possibility that the focus variation of 5·F·δ, that is, about 5 depth or more may occur. After the target position is corrected, the flow is finished.

As described above, in the AF process during zooming in this embodiment, as illustrated in FIG. 26B, when the reliability of the defocus amount is high, the camera controller 1114 controls the focus lens 1103 to the target position based on the detected defocus amount. On the other hand, when the reliability is low, the camera controller 1114 controls the focus lens 1103 to the target position based on the current lens position. When the reliability where the in-focus position cannot be specified is acquired, the camera controller 1114 explicitly controls not to drive the focus lens 1103.

FIG. 26C is a diagram illustrating the tracking movement of the focus lens 1003 based on the cam locus information during the change of the focal length, and symbol P2 indicates the current position at a certain control timing. FIG. 26C illustrates the cam locus tracking process performed by the lens controller 1217 of the lens device 1100 with the tracking object distance as distance A, independently of the instruction of the camera controller 1114 of the image capturing apparatus body 1200.

FIG. 26C ((1) to (6)) illustrates a relationship of the drive target position of the focus lens 1103 according to the reliability of the defocus amount when the AF process during zooming described above is performed by the camera controller 1114 at this control timing. The target positions for the cases of the reliabilities "1" to "4" in FIG. 26B correspond to (1) to (4) in FIG. 26C, respectively. That is, the reliability "1" corresponds to distance B, the reliability "2" corresponds to distance C, the reliability "3" corresponds to distance D, and the reliability "4" corresponds to distance A equal to the current position and in this case the camera controller 1114 does not explicitly drive the focus lens 1103. Similarly to FIG. 18C, when the target position is larger than the predetermined lens drive amount (N·F·δ), (5) in FIG. 26C is adopted to correspond to distance E and it is corrected to distance F corresponding to (6). As described above, the lens apparatus 1100 performing the cam locus tracking process and the image capturing apparatus body 1200 correcting the focus position according to the defocus amount and its reliability operate in conjunction with each other to achieve the focus control during zooming.

According to this embodiment, when the target position is selected based on the defocus amount and its reliability, the target position for controlling the focus lens in zooming is determined and controlled based on the selection rule different from that while the zooming is not performed. That is, the focus control unit (camera controller 1114) limits the drive range of the focus lens in accordance with the defocus amount and the reliability during the drive of the zoom lens. More specifically, when it is determined that the movement amount of the focus lens is greater than a predetermined amount during the drive of the zoom lens, the focus controller corrects the target position of the focus lens such that the movement amount of the focus lens does not exceed the predetermined amount. This makes it possible to suppress the occurrence of sudden focus change during zooming and to maintain the continuity of the focus change. This embodiment describes an example in which the zoom lens 1101 is manually operated, but the present invention is not limited thereto. For example, as in the second embodiment, a configuration may be adopted where a zoom lens driver is provided inside the lens device 1100 and the lens controller 1217 controls the zoom lens driver. Alternatively, an independent zoom lens driver outside the lens apparatus 1100 may be detachably attached to the lens apparatus 1100. In any case, the driver is not limited as long as it can detect the movement state of the zoom lens.

Fourth Embodiment

Next, a fourth embodiment of the present invention will be described. In the second embodiment and the third embodiment, the configuration considering the difference in the hardware configuration is mainly described, but the present invention is not limited thereto. For example, the following configuration is also conceivable.

<Switching of Control Method Suitable for Operation State>

It may be considered that, according to the operation state of the image capturing apparatus or the lens apparatus (lens barrel), a control method in which focusing is controlled with the highest priority irrespective of the change in focus even during zooming (focus tracking priority control) and a control method in which the continuity of focus is prioritized are switched to be used. For example, the limitation of the drive amount at steps S1808b and S1809b in FIG. 17B is not performed, and switching is performed in a direction that positively reflects the defocus amount detected from α at step S1805b or β at step S1806b. As a result, it is possible to achieve the focus tracking priority control. Further, the drive amount limits of steps S2007b and S2008b in FIG. 19a are not performed, and switching is performed in a direction that positively reflects the defocus amount detected from α at step S2005b or β at step S2006b. As a result, it is possible to realize the focus tracking priority control. In addition, during zooming, the focus tracking priority control can be realized by performing the AF process while zooming is stopped.

As a condition for switching between the focus tracking priority control and the conventional focus continuity priority control during zooming, there is a condition common to the configurations of the second embodiment and the third embodiment as follows. For example, it is a switching method according to the speed of the zoom lens, the focus tracking priority control is used when the zoom speed is fast and the change of the captured image such as live view is large, and the focus continuity priority control is used when the zoom speed is slow and the change of the captured image is gentle. Further, a switching method according to the recording state of a moving image is also conceivable. For example, the focus tracking priority control is used while the moving image is not recorded, the focus continuity priority control is used while the moving image is recorded. Furthermore, in the configuration of the second embodiment, the camera controller 1114 recognizes the cam locus information. For this reason, the focus continuity priority control is used in a region with a low density of the cam locus information, that is, in a region where the drive range of the focus lens is wide, and the focus tracking priority control is used in a region with a high density of the cam locus information, that is, in a region where the drive range of the focus lens is narrow. In addition, a switching method according to the shape of the cam locus information is conceivable. For example, the focus tracking priority control is used in a region where the shape change is large, and the focus continuity priority control is used in a region where the shape change is small.

As described above, according to this embodiment, since the focus tracking priority control and the focus continuity priority control can be switched according to various states of the image capturing apparatus, it is possible to appropriately switch the control method depending on the required focus change.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-163224, filed on Aug. 24, 2016, and No. 2017-151555, filed on Aug. 4, 2017, which are hereby incorporated by reference herein in their entirety.

What is claimed is:

1. A control apparatus comprising:
at least one processor; and
a memory including instructions that, when executed by the at least one processor, cause the at least one processor to operate as:
  an acquirer configured to acquire a first signal and a second signal that correspond to light beams passing through different pupil regions of an image capturing optical system,
  a calculator configured to perform a plurality of filtering processes with different bands for the first signal and the second signal to calculate a plurality of defocus amounts and reliabilities based on the first signals and the second signals where the respective filtering processes have been performed, and
  a determiner configured to determine a defocus amount used for focusing from among the plurality of defocus amounts based on a difference between the plurality of defocus amounts and at least one of the plurality of reliabilities,
wherein the plurality of filtering processes include:
  a first filtering process for extracting the first and second signals with a first frequency band, and
  a second filtering process for extracting the first and second signals with a second frequency band higher than the first frequency band,
wherein the calculator is configured to calculate, as the plurality of defocus amounts and reliabilities:
  a first defocus amount and a first reliability based on the first and second signals where the first filtering process has been performed, and
  a second defocus amount and a second reliability based on the first and second signals where the second filtering process has been performed, and
wherein when the difference between the first defocus amount and the second defocus amount is greater than a first threshold value, the calculator is configured to determine the first defocus amount as the defocus amount used for the focusing.

2. The control apparatus according to claim 1, wherein the calculator is configured to:
determine the second defocus amount as the defocus amount used for the focusing when the second reliability is higher than the first reliability and the second reliability is higher than a predetermined reliability threshold value, and
determine the first defocus amount as the defocus amount used for the focusing when the second reliability is lower than the first reliability or the second reliability is lower than the predetermined reliability threshold value.

3. The control apparatus according to claim 1, wherein:
the plurality of filtering processes include a third filtering process for extracting the first and second signals with a third frequency band higher than the second frequency band, and
the calculator is configured to calculate a third defocus amount and a third reliability based on the first and second signals where the third filtering process has been performed.

4. The control apparatus according to claim 3, wherein when the difference between the second defocus amount and the third defocus amount is greater than a second threshold value, the calculator is configured to determine the second defocus amount as the defocus amount used for the focusing.

5. The control apparatus according to claim 4, wherein the calculator is configured to:
determine the third defocus amount as the defocus amount used for the focusing when the third reliability is higher than the second reliability and each of the second reliability and the third reliability is higher than a predetermined reliability threshold value, and
determine the second defocus amount as the defocus amount used for the focusing when the third reliability is lower than the second reliability or the at least one of the second reliability and the third reliability is lower than the predetermined reliability threshold value.

6. The control apparatus according to claim 4, wherein the second threshold value is smaller than the first threshold value.

7. The control apparatus according to claim 4, wherein each of the first threshold value and the second threshold value is greater than a depth of focus.

8. A control apparatus comprising:
at least one processor; and
a memory including instructions that, when executed by the at least one processor, cause the at least one processor to operate as:
an acquirer configured to acquire a first signal and a second signal that correspond to light beams passing through different pupil regions of an image capturing optical system,
a calculator configured to calculate a defocus amount and a reliability based on the first signal and the second signal, and
a focus controller configured to control a focus lens depending on the defocus amount and the reliability,
wherein the focus controller is configured to change control that depends on the defocus amount and the reliability between in a first mode where focus control is performed over a whole of a movable range of the focus lens and in a second mode where the focus control is performed within a predetermined range based on a focus lens position set by a user, and
wherein the focus controller changes a condition of a frame addition that depends on the defocus amount and the reliability between in the first mode and the second mode.

9. The control apparatus according to claim 8, wherein the focus controller is configured to change the number of times of driving the focus lens that depends on the defocus amount and the reliability between in the first mode and the second mode.

10. The control apparatus according to claim 9, wherein:
the calculator is configured to perform a plurality of filtering processes with different bands for the first and second signals to calculate a plurality of defocus amounts based on the first and second signals where the respective filtering processes have been performed, and
the focus controller is configured to control the focus lens based on a defocus amount with a highest band of the plurality of defocus amounts calculated by the calculator in the second mode.

* * * * *